US012677099B2

(12) United States Patent
Yamamoto

(10) Patent No.: US 12,677,099 B2
(45) Date of Patent: Jul. 7, 2026

(54) ULTRASONIC TRANSDUCER AND PARAMETRIC SPEAKER PROVIDED WITH THE SAME

(71) Applicant: Murata Manufacturing Co., Ltd., Nagaokakyo (JP)

(72) Inventor: Hironari Yamamoto, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 170 days.

(21) Appl. No.: 18/768,279

(22) Filed: Jul. 10, 2024

(65) Prior Publication Data

US 2024/0365070 A1 Oct. 31, 2024

Related U.S. Application Data

(63) Continuation of application No. PCT/JP2023/026362, filed on Jul. 19, 2023.

(30) Foreign Application Priority Data

Dec. 1, 2022 (JP) ................................ 2022-192879

(51) Int. Cl.
*H04R 17/00* (2006.01)
*H04R 1/28* (2006.01)

(52) U.S. Cl.
CPC ............... *H04R 17/00* (2013.01); *H04R 1/28* (2013.01)

(58) Field of Classification Search
CPC .................................. H04R 17/00; H04R 1/28
See application file for complete search history.

(56) References Cited

U.S. PATENT DOCUMENTS

2001/0033669 A1* 10/2001 Bank ...................... H04R 1/028 381/338
2010/0246863 A1* 9/2010 Onishi .................. H04R 17/00 381/190

(Continued)

FOREIGN PATENT DOCUMENTS

CN 115103280 A 9/2022
JP 2006025109 A 1/2006

(Continued)

OTHER PUBLICATIONS

International Search Report and Written Opinion in PCT/JP2023/026362, mailed Oct. 17, 2023, 8 pages.

*Primary Examiner* — Suhan Ni
(74) *Attorney, Agent, or Firm* — Keating & Bennett, LLP

(57) ABSTRACT

An ultrasonic transducer includes a diaphragm, a frame, an ultrasonic vibrator, and a resonance plate. The frame extends in a longitudinal direction and is bonded to the diaphragm. The ultrasonic vibrator is attached to the frame, respectively, and faces the diaphragm with a space therebetween. The resonance plate extends along the longitudinal direction and faces the diaphragm with a gap therebetween, on a side opposite to the frame with respect to the diaphragm. The diaphragm vibrates resonantly perpendicular to the diaphragm, in a phase opposite to the ultrasonic vibrator. A dimension of an inner side portion of the frame in the longitudinal direction is greater than a dimension of the inner side portion of the frame in a lateral direction perpendicular. When a wavelength converted from a driving frequency of the ultrasonic vibrator is λ, a λ/2 air resonance can occur in the gap in the lateral direction.

20 Claims, 15 Drawing Sheets

(56) References Cited

U.S. PATENT DOCUMENTS

| | | | |
|---|---|---|---|
| 2013/0140956 A1 | 6/2013 | Mitani et al. | |
| 2013/0170389 A1* | 7/2013 | Jee | H04W 36/20 370/332 |
| 2014/0139071 A1 | 5/2014 | Yamamoto et al. | |
| 2022/0169497 A1 | 6/2022 | Savoia et al. | |

FOREIGN PATENT DOCUMENTS

| | | |
|---|---|---|
| WO | 2012026319 A1 | 3/2012 |
| WO | 2013018579 A1 | 2/2013 |
| WO | 2016104414 A1 | 6/2016 |

* cited by examiner

ULTRASONIC TRANSDUCER AND PARAMETRIC SPEAKER PROVIDED WITH THE SAME

CROSS REFERENCE TO RELATED APPLICATIONS

This application claims the benefit of priority to Japanese Patent Application No. 2022-192879 filed on Dec. 1, 2022 and is a Continuation Application of PCT Application No. PCT/JP2023/026362 filed on Jul. 19, 2023. The entire contents of each application are hereby incorporated herein by reference.

BACKGROUND OF THE INVENTION

1. Field of the Invention

The present invention relates to ultrasonic transducers and parametric speaker including ultrasonic transducers.

2. Description of the Related Art

International Publication No. 2012/026319 and International Publication No. 2013/018579 disclose an ultrasonic transducer in which the sound pressure level is increased using air resonance. The ultrasonic transducers described in International Publication No. 2012/026319 and International Publication No. 2013/018579 include an ultrasonic wave generator and a case. The ultrasonic wave generator has a piezoelectric vibrator. The case has an ultrasonic wave emission hole and houses the ultrasonic wave generator. The ultrasonic wave generator and the case form an acoustic path from the piezoelectric vibrator to the ultrasonic wave emission hole, with air as the medium. In the acoustic path, an air resonance is caused by the ultrasonic wave generated by the piezoelectric vibrator, with the ultrasonic wave emission hole as an open end.

SUMMARY OF THE INVENTION

In the ultrasonic transducers described in International Publication No. 2012/026319 and International Publication No. 2013/018579, there is room to increase the sound pressure level with a more compact configuration.

Example embodiments of the present invention provide ultrasonic transducers each capable of increasing a sound pressure level with a compact configuration, and parametric speakers each including such an ultrasonic transducer.

An ultrasonic transducer according to an example embodiment of the present invention includes a diaphragm, at least one frame, at least one ultrasonic vibrator, and at least one resonance plate. The at least one frame extends in a longitudinal direction and is bonded to the diaphragm. The at least one ultrasonic vibrator is attached to the at least one frame, respectively, and faces the diaphragm with a space therebetween. The at least one resonance plate extends along the longitudinal direction while facing the diaphragm with a gap therebetween, on a side opposite to the at least one frame with respect to the diaphragm. The diaphragm is structured to vibrate resonantly in a direction perpendicular or substantially perpendicular to the diaphragm, in a phase opposite to the at least one ultrasonic vibrator. A dimension of an inner side portion of the at least one frame in the longitudinal direction is greater than a dimension of the inner side portion of the at least one frame in a lateral direction perpendicular or substantially perpendicular to the longitudinal direction. When a wavelength converted from a driving frequency of the at least one ultrasonic vibrator is λ, a λ/2 air resonance is capable of occurring in the gap in the lateral direction.

According to example embodiments of the present invention, in the ultrasonic transducers, a sound pressure level is increased with a compact configuration.

The above and other elements, features, steps, characteristics and advantages of the present invention will become more apparent from the following detailed description of the example embodiments with reference to the attached drawings.

DETAILED DESCRIPTION OF THE EXAMPLE EMBODIMENTS

Figure 1:
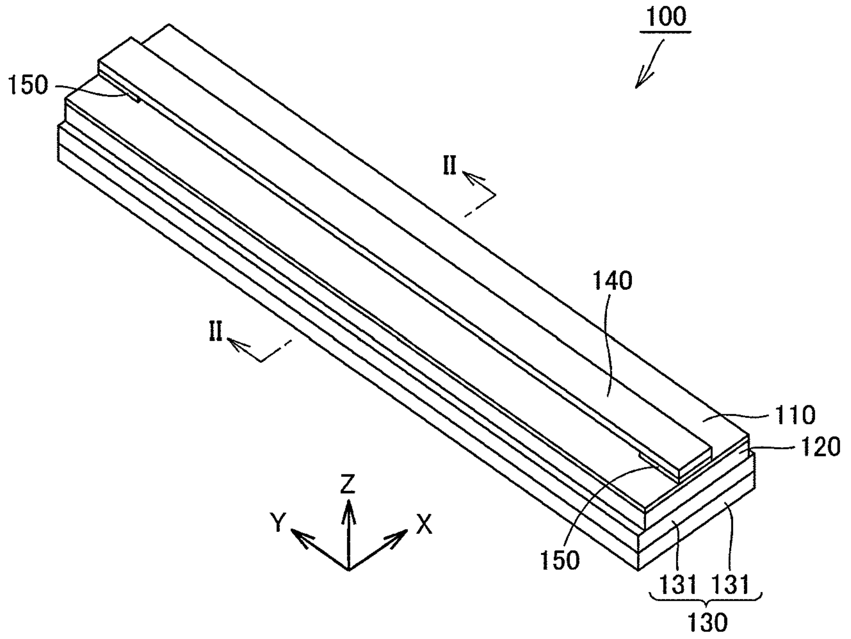
FIG. 1 is a perspective view showing a configuration of an ultrasonic transducer according to Example Embodiment 1 of the present invention.

Ultrasonic transducers according to example embodiments of the present invention will be described below with reference to the drawings. In the following description of the example embodiments, the same or equivalent components in the drawings are denoted by the same reference signs and the descriptions thereof are not repeated. Example embodiments of the present invention are applicable for applications requiring ultrasonic wave with high sound pressure, such as an ultrasonic transducer for a parametric speaker, an ultrasonic sensor, a non-contact haptic, or the like. In the following example embodiments, ultrasonic transducers for parametric speakers will be described by example, but applications of the ultrasonic transducers are not limited thereto.

Example Embodiment 1

Figure 2:
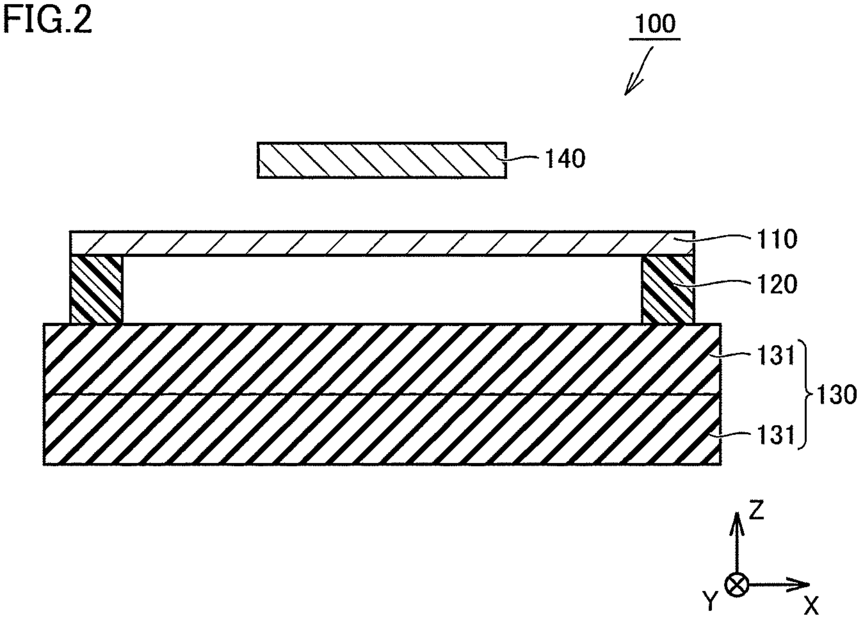
FIG. 2 is a cross-sectional view of the ultrasonic transducer shown in FIG. 1 when viewed from the II-II arrow direction.
Figure 3:
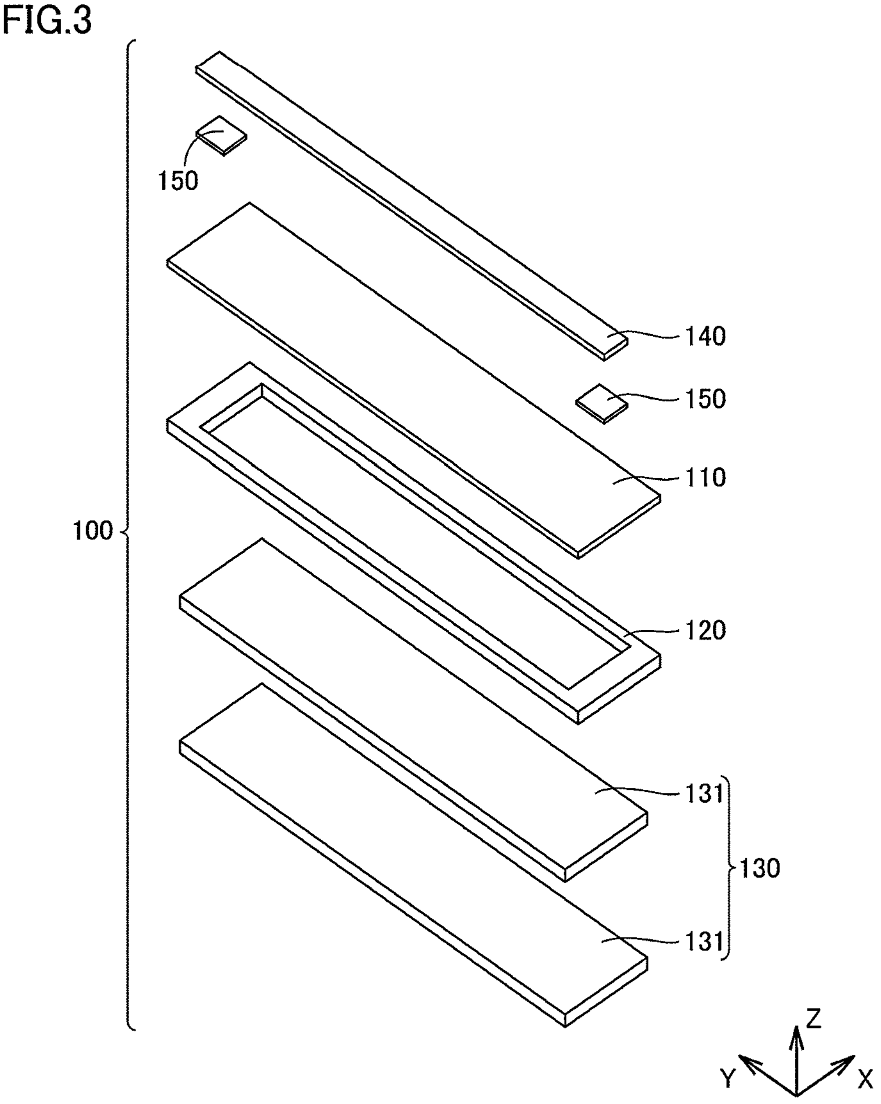
FIG. 3 is an exploded perspective view showing the configuration of the ultrasonic transducer according to Example Embodiment 1 of the present invention.

FIG. 1 is a perspective view showing the configuration of an ultrasonic transducer according to Example Embodiment 1 of the present invention. FIG. 2 is a cross-sectional view of the ultrasonic transducer shown in FIG. 1 when viewed from the II-II arrow direction. FIG. 3 is an exploded perspective view showing the configuration of the ultrasonic transducer according to Example Embodiment 1 of the present invention. As shown in FIGS. 1 to 3, an ultrasonic transducer 100 according to Example Embodiment 1 of the present invention includes a diaphragm 110, a frame 120, an ultrasonic vibrator 130, a resonance plate 140, and spacers 150.

The diaphragm 110 has a flat plate shape. The diaphragm 110 is made of an aluminum alloy such as duralumin containing aluminum, or a metal such as a stainless steel. In the present example embodiment, the diaphragm 110 is made of a stainless steel. The thickness of the diaphragm 110 is, for example, about 0.1 mm or more and about 0.2 mm or less.

The frame 120 has a rectangular or substantially rectangular ring shape. The frame 120 has a lateral direction along a first direction (X-axis direction) and has a longitudinal direction along a second direction (Y-axis direction). The frame 120 extends in the second direction (Y-axis direction). The axial direction of the frame 120 extends along a third direction (Z-axis direction). One end of the frame 120 in the third direction (Z-axis direction) is bonded to the diaphragm 110 by a bonding agent made of epoxy resin or the like.

The frame 120 is formed from a metal, such as an aluminum alloy or a stainless steel, glass epoxy, a resin or the like. From the viewpoint of reducing or preventing changes in the characteristics of ultrasonic the transducer 100 due to temperature changes, it is preferable that the frame 120 be made of a metal. On the other hand, from the viewpoint of making the ultrasonic wave transmitted or received by the ultrasonic transducer 100 lower in frequency and from the viewpoint of making the ultrasonic transducer 100 compact, it is preferable that the frame 120 be made of a resin. In the present example embodiment, the frame 120 is made of a stainless steel. The thickness of the frame 120 is, for example, about 0.2 mm or more and about 0.8 mm or less.

Figure 4:
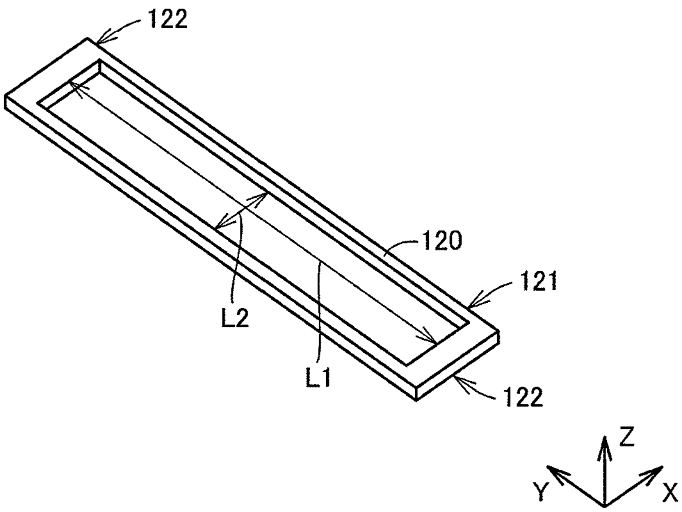
FIG. 4 is a perspective view showing the configuration of a frame of the ultrasonic transducer according to Example Embodiment 1 of the present invention.

FIG. 4 is a perspective view showing the configuration of the frame of the ultrasonic transducer according to Example Embodiment 1 of the present invention. As shown in FIG. 4, the frame 120 has a pair of long side portions 121 extending in the second direction (Y-axis direction) and a pair of short side portions 122 extending in the first direction (X-axis direction). The average distance between the short side portions 122 is four or more times the shortest distance between the long side portions 121. That is, a longitudinal dimension L1 of the inner side portion of the frame 120 in the second direction (Y-axis direction) is four or more times a lateral dimension L2 of the inner side portion of the frame 120 in the first direction (X-axis direction). However, the longitudinal dimension L1 is not limited to four or more times the lateral dimension L2 as long as it is greater than the lateral dimension L2.

The corner sandwiched between the long side portion 121 and the short side portion 122 may be chamfered. The shape of the short side portion 122 is not limited to a straight shape when viewed from the third direction (Z-axis direction), but may be an arc convex to the inner side portion of the frame 120 or an arc convex to the outer side portion of the frame 120.

By changing the lateral dimension L2 of the inner side portion of the frame 120 in the first direction (X-axis direction), the resonance frequency of the diaphragm 110 can be adjusted. For example, if the resonance frequency of the diaphragm 110 is 100 kHz or higher, the lateral dimension L2 is about 1.5 mm or more and about 3 mm or less.

The longitudinal dimension L1 of the inner side portion of the frame 120 in the second direction (Y-axis direction) is four or more times the lateral dimension L2. However, from the viewpoint of increasing the sound pressure level of the ultrasonic wave transmitted by the ultrasonic transducer 100, the longitudinal dimension L1 is, for example, about 20 mm or more.

Figure 5:
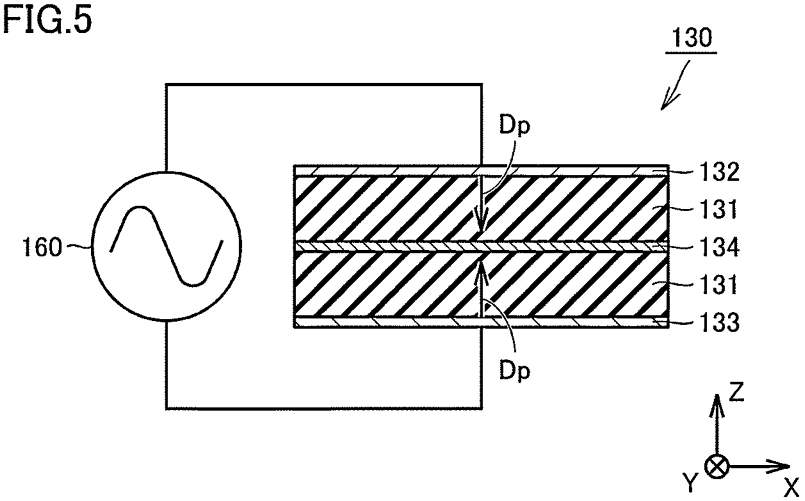
FIG. 5 is a cross-sectional view showing the configuration of an ultrasonic vibrator of the ultrasonic transducer according to Example Embodiment 1 of the present invention.

FIG. 5 is a cross-sectional view showing the configuration of the ultrasonic vibrator of the ultrasonic transducer according to Example Embodiment 1 of the present invention. As shown in FIG. 1, the ultrasonic vibrator 130 is attached to the frame 120 and faces the diaphragm 110 with a space therebetween. Specifically, the ultrasonic vibrator 130 is attached to the other end of the frame 120 in the third direction (Z-axis direction) and faces the diaphragm 110 with the inner space of the frame 120 sandwiched therebetween.

As shown in FIGS. 1, 2, and 5, the ultrasonic vibrator 130 is a piezoelectric element including piezoelectric bodies 131. As shown in FIG. 5, in the present example embodiment, the ultrasonic vibrator 130 includes two laminated piezoelectric bodies 131. The polarization directions Dp of the two piezoelectric bodies 131 are different from each other. Specifically, the polarization directions of the two Dp piezoelectric bodies 131 face each other in the third direction (Z-axis direction). The two piezoelectric bodies 131 are sandwiched between a first electrode 132 and a second electrode 133, and a middle electrode 134 is interposed between the two piezoelectric bodies 131. The first electrode 132 and the second electrode 133 are electrically connected to a processing circuit 160 capable of applying an AC voltage. The ultrasonic vibrator 130 is a so-called series-type bimorph piezoelectric vibrator. The total thickness of the two piezoelectric bodies 131 is, for example, about 0.5 mm or more and about 0.85 mm or less. The ultrasonic vibrator 130 is not limited to a series-type bimorph piezoelectric vibrator, but may be a parallel-type bimorph piezoelectric vibrator, a multimorph piezoelectric vibrator or an unimorph piezoelectric vibrator.

Figure 6:
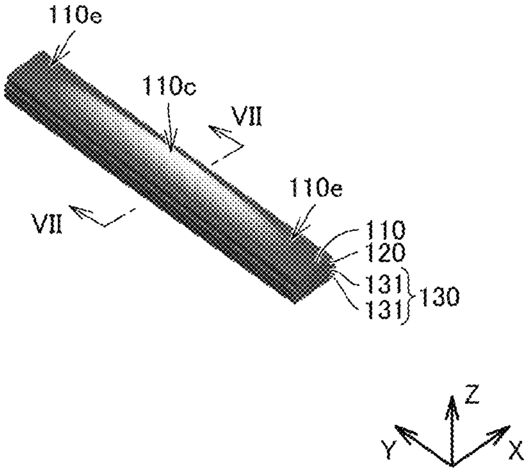
FIG. 6 is a perspective view showing a displacement state of a diaphragm and the ultrasonic vibrator obtained by performing a simulation analysis using the finite element method, when the ultrasonic transducer according to Example Embodiment 1 of the present invention is transmitting or receiving an ultrasonic wave.
Figure 7:
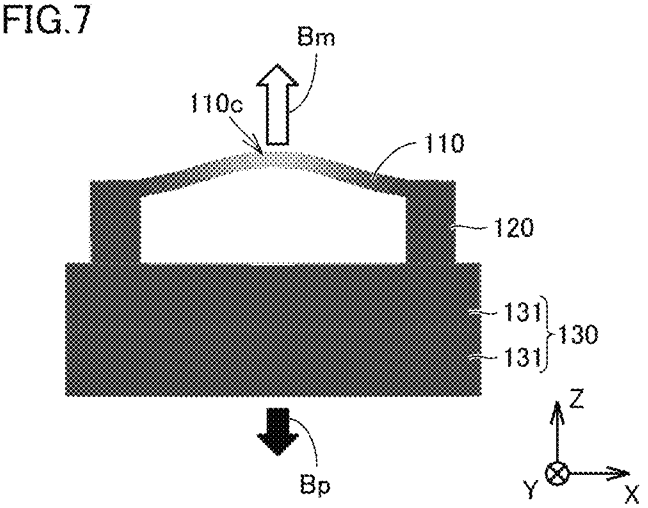
FIG. 7 is a cross-sectional view of the ultrasonic transducer shown in FIG. 6 when viewed from the VII-VII arrow direction.

FIG. 6 is a perspective view showing a displacement state of the diaphragm and the ultrasonic vibrator obtained by performing a simulation analysis using the finite element method, when the ultrasonic transducer according to Example Embodiment 1 of the present invention is transmitting or receiving an ultrasonic wave. FIG. 7 is a cross-sectional view of the ultrasonic transducer shown in FIG. 6 when viewed from the VII-VII arrow direction. In FIGS. 6 and 7, the resonance plate 140 is not shown. The simulation analysis conditions were as follows, for example: the thickness of the diaphragm 110 was about 0.1 mm, the total thickness of the two piezoelectric bodies 131 was about 0.8 mm, the longitudinal dimension L1 of the inner side portion of the frame 120 was about 20 mm, the lateral dimension L2 of the inner side portion of the frame 120 was about 2 mm, and the thickness of the frame 120 in the third direction (Z-axis direction) was about 0.4 mm.

As shown in FIGS. 6 and 7, in the vibration mode of the ultrasonic transducer 100 according to Example Embodiment 1 of the present invention, the diaphragm 110 vibrates resonantly in the third direction (Z-axis direction) perpendicular or substantially perpendicular to the diaphragm 110, in a phase opposite to the ultrasonic vibrator 130. In other words, as shown in FIG. 7, the displacement direction of the resonance vibration Bm of the diaphragm 110 and the displacement direction of the resonance vibration Bp of the ultrasonic vibrator 130 are opposite to each other in the third direction (Z-axis direction). In the present example embodiment, the resonance frequency of the diaphragm 110 and the ultrasonic vibrator 130 is about 100 kHz or higher, for example.

In the diaphragm 110, a middle portion 110*c* located in the middle of the inner side portion of the frame 120 in the longitudinal direction is the belly of resonance vibration, and end portions 110*e* located at both end portions of the inner side portion of the frame 120 in the longitudinal direction are the nodes of resonance vibration. In other words, the portion of the diaphragm 110 located above the inner space of the frame 120 is a vibration region where the resonance vibration occurs. The longitudinal dimension of the vibration region of the diaphragm 110 is the same as the longitudinal dimension L1 of the inner side portion of the frame 120, and the lateral dimension of the vibration region of the diaphragm 110 is the same as the lateral dimension L2 of the inner side portion of the frame 120.

The resonance frequency of the diaphragm 110 is determined by the acoustic velocity of the diaphragm 110 and the reflection of the vibration with the frame 120 as the fixed end. However, from the point when the longitudinal dimension L1 of the inner side portion of the frame 120 exceeds four times the lateral dimension L2 of the inner side portion of the frame 120, the influence of the lateral dimension L2 becomes dominant with respect to the reflection of vibration, and the state of reflection of vibration does not change even when the longitudinal dimension L1 becomes further greater than four times the lateral dimension L2.

As the longitudinal dimension L1 of the inner side portion of the frame 120 increases, the sound pressure of the ultrasonic wave transmitted from the ultrasonic transducer 100 increases. This means that even if the longitudinal dimension of the vibration region of the diaphragm 110 is increased, the entire vibration region of the diaphragm 110 between the both end portions 110*e* is still vibrating. In other words, when the vibration region of the diaphragm 110 becomes longer, the area of the vibration region of the diaphragm 110 can be increased accordingly. As a result, high sound pressure can be obtained by increasing the air pressure change due to vibration of the diaphragm 110.

By increasing the longitudinal dimension of the vibration region of the diaphragm 110, the ultrasonic transducer 100 according to the present example embodiment can increase the sound pressure while maintaining the resonance frequency and the sound pressure substantially constant. Further, since node points are provided at both end portions in the longitudinal direction, the both end portions can be supported or secured, so that the ultrasonic transducer 100 can be easily mounted.

As shown in FIGS. 1 and 3, the two spacers 150 are respectively disposed on node points, where less vibration is generated, of the diaphragm 110. In the present example embodiment, the two spacers 150 are disposed respectively at the end portions of the diaphragm 110 in the second direction (Y-axis direction). However, if the resonance frequency of the diaphragm 110 and the ultrasonic vibrator 130 is low frequency of, for example, about 40 kHz, the two spacers 150 may be disposed respectively at the end portions of the diaphragm 110 in the first direction (X-axis direction).

The resonance plate 140 is provided on the two spacers 150. The resonance plate 140 extends along the second direction (Y-axis direction) while facing the diaphragm 110 with a gap therebetween, on a side opposite to the frame 120 with respect to the diaphragm 110. The central axis of the resonance plate 140 extending in the second direction (Y-axis direction) is along the central axis of the vibration region of the diaphragm 110 extending in the second direction (Y-axis direction). Ideally, when viewed from the third direction (Z-axis direction), the central axis of the resonance plate 140 extending in the second direction (Y-axis direction) overlaps the central axis of the vibration region of the diaphragm 110 extending in the second direction (Y-axis direction).

The dimension of the gap between the diaphragm 110 and the resonance plate 140 in the third direction (Z-axis direction) is defined by the spacer 150. The spacer 150 may include a metal plate with adhesive coated on both sides or be formed of a double-sided tape. The dimension of the thickness of the spacer 150 is determined according to the frequency of the air resonance generated in the gap between the diaphragm 110 and the resonance plate 140, as described below. The dimension of the thickness of the spacer 150 is about 0.1 mm when the frequency of the air resonance is about 150 kHz, and is about 0.1 mm or more and about 0.2 mm or less when the frequency of the air resonance is about 100 kHz, for example.

The length of the resonance plate 140 in the second direction (Y-axis direction) is substantially the same as the length of the diaphragm 110 in the second direction (Y-axis direction). The thinner the resonance plate 140 is, the more the air resonance is likely to occur in the gap between the diaphragm 110 and the resonance plate 140. In the present example embodiment, the resonance plate 140 is made of a stainless steel. The material of the resonance plate 140 is not limited to a stainless steel, but may also be an aluminum alloy or a resin with high rigidity. The thickness of the resonance plate 140 is, for example, about 0.1 mm or more and about 0.2 mm or less. The width of the resonance plate 140 in the first direction (X-axis direction) is about 0.7 mm or more and about 0.9 mm or less when the frequency of the air resonance is about 150 kHz, and is about 1.1 mm or more and about 1.4 mm or less when the frequency of the air resonance is about 100 kHz, for example.

In the ultrasonic transducer according to Example Embodiment 1 of the present invention, when the wavelength converted from the driving frequency of the ultrasonic vibrator 130 is λ, a λ/2 air resonance can occur in the first direction (X-axis direction), in the gap between the diaphragm 110 and the resonance plate 140. Each configuration of the ultrasonic transducer 100 is designed so that the frequency of the air resonance occurring in the gap between the diaphragm 110 and the resonance plate 140 is within about +10% of the resonance frequency of the diaphragm 110 and the ultrasonic vibrator 130.

Figure 8:
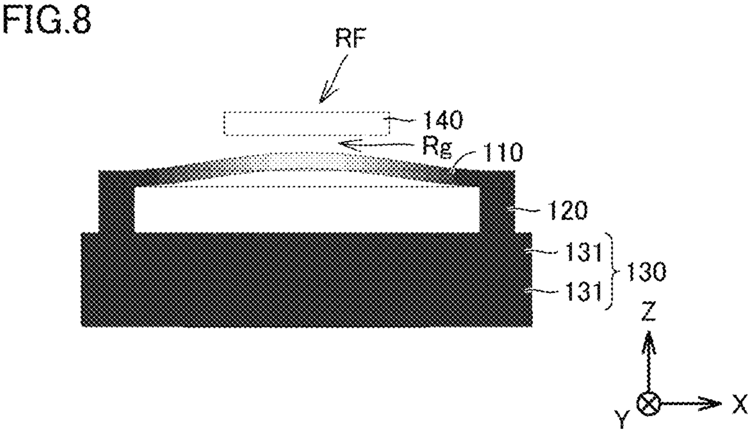
FIG. 8 is a view showing a displacement state of the diaphragm and the ultrasonic vibrator obtained by performing a simulation analysis using the finite element method, when a λ/2 air resonance occurs while transmitting ultrasonic wave in the ultrasonic transducer according to Example Embodiment 1 of the present invention.

FIG. 8 is a view showing a displacement state of the diaphragm and the ultrasonic vibrator obtained by performing a simulation analysis using the finite element method, when a λ/2 air resonance occurs while transmitting ultrasonic wave in the ultrasonic transducer according to Example Embodiment 1 of the present invention. As shown in FIG. 8, since the displacement of the resonance vibration of the diaphragm 110 is larger than the displacement of the resonance vibration of the ultrasonic vibrator 130, the main ultrasonic wave is radiated in the third direction (Z-axis direction) perpendicular to the diaphragm 110.

Figure 9:
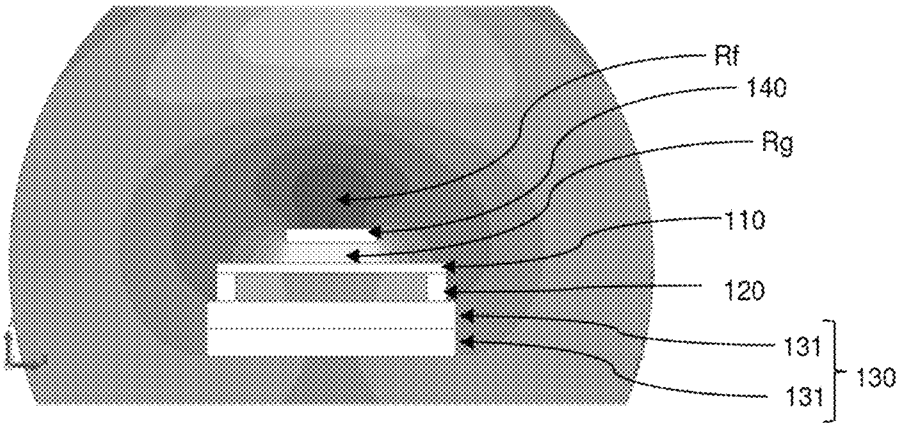
FIG. 9 is a view showing a sound pressure distribution obtained by performing a simulation analysis using the finite element method, when a λ/2 air resonance occurs in the ultrasonic transducer according to Example Embodiment 1 of the present invention.

FIG. 9 is a view showing a sound pressure distribution obtained by performing a simulation analysis using the finite element method, when a λ/2 air resonance occurs in the ultrasonic transducer according to Example Embodiment 1 of the present invention. In FIG. 9, the sound pressure increases from black to white in the portion where air is present. In the condition shown in FIG. 9, the sound pressure is higher in a gap Rg between the diaphragm 110 and the resonance plate 140, and lower in a region Rf directly above the resonance plate 140.

Figure 10:
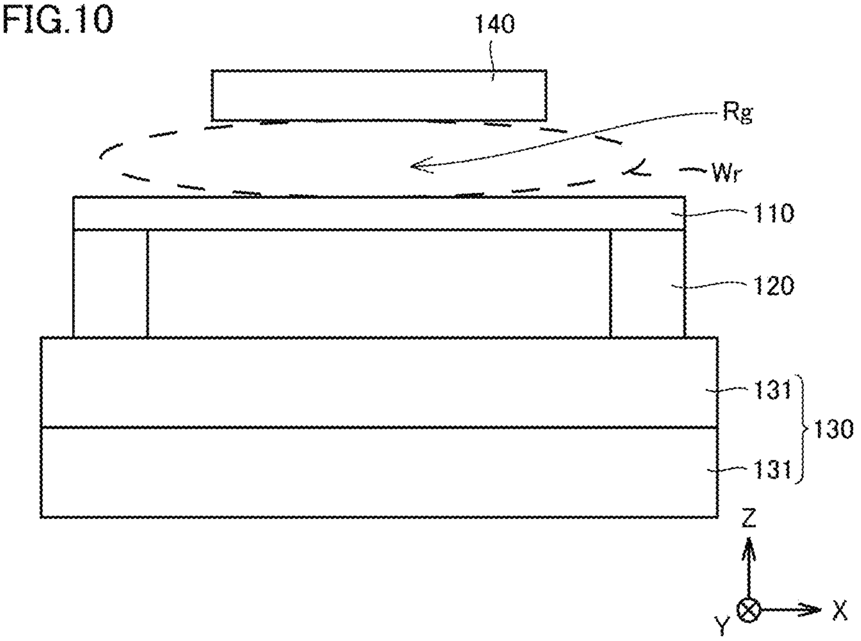
FIG. 10 is a view showing the λ/2 air resonance occurring in the ultrasonic transducer according to Example Embodiment 1 of the present invention.

FIG. 10 is a view showing the λ/2 air resonance occurring in the ultrasonic transducer according to Example Embodiment 1 of the present invention. When the diaphragm 110 is displaced upward, a region on the central axis of the vibration region of the diaphragm 110 extending in the second direction (Y-axis direction) is compressed to increase the sound pressure between the diaphragm 110 and the resonance plate 140, thereby becoming the belly of an air resonance Wr as shown in FIG. 10. The region of the outer side portion of the gap Rg between the diaphragm 110 and the resonance plate 140 is open to air and thus becomes nodes of the air resonance Wr, as shown in FIG. 10. In other words, the region of the outer side portion of the gap Rg between the diaphragm 110 and the resonance plate 140 is an open end of the air resonance Wr.

Figure 11:
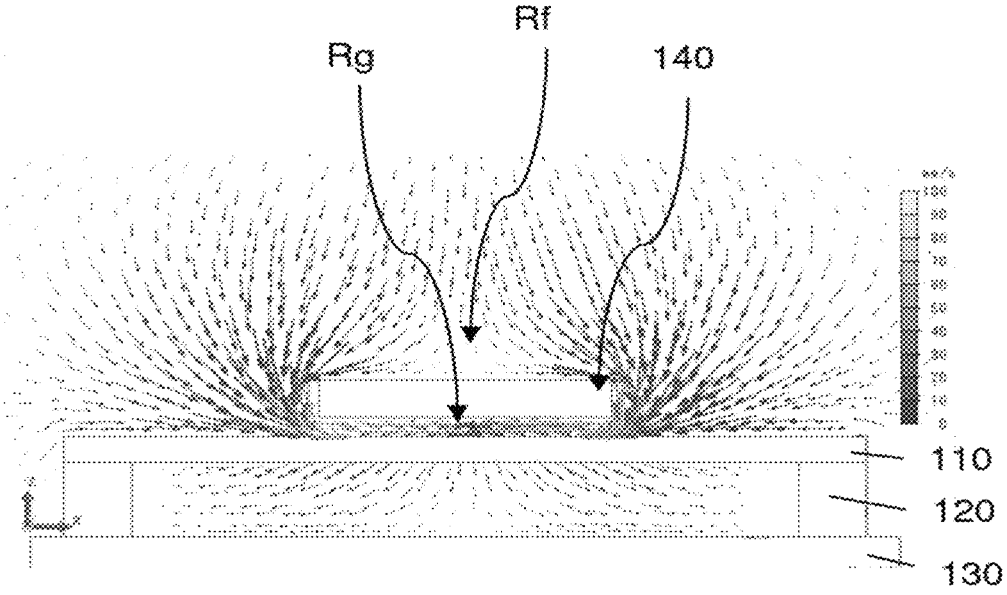
FIG. 11 is a view showing the particle velocity obtained by performing a simulation analysis using the finite element method, when a λ/2 air resonance occurs in the ultrasonic transducer according to Example Embodiment 1 of the present invention.

FIG. 11 is a view showing the particle velocity obtained by performing a simulation analysis using the finite element method, when a λ/2 air resonance occurs in the ultrasonic transducer according to Example Embodiment 1 of the present invention. The particle velocity indicates air flow. FIG. 11 shows a state where the diaphragm 110 is displaced downward. As shown in FIG. 11, when the diaphragm 110 is displaced downward, air in the region Rf directly above the resonance plate 140 is sucked into the gap Rg between the diaphragm 110 and the resonance plate 140. Conversely, when the diaphragm 110 is displaced upward, air in the gap Rg between the diaphragm 110 and the resonance plate 140 is released into the region Rf directly above the resonance plate 140.

Thus, when a λ/2 air resonance is occurring, a virtual sound source is generated in which the sound pressure is higher or lower in the region Rf directly above the resonance plate 140 due to air flow in and out the region Rf directly above the resonance plate 140. Thus, in the ultrasonic transducer 100 when a λ/2 air resonance is occurring, the sound pressure due to the virtual sound source is superimposed, and an ultrasonic wave with a high sound pressure level are radiated.

Figure 12:
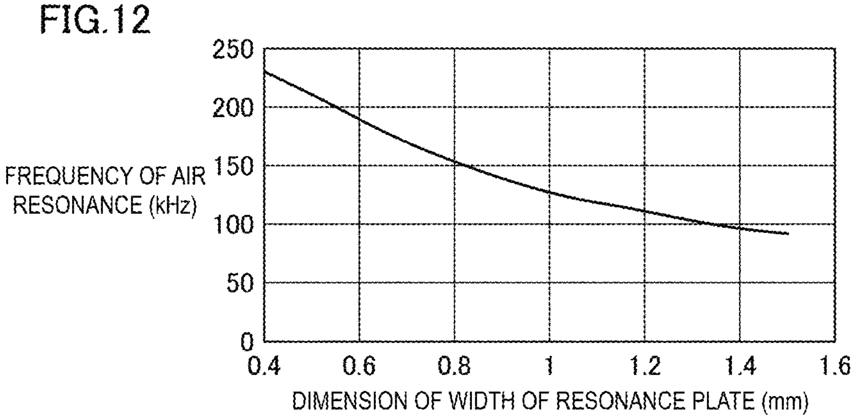
FIG. 12 is a graph obtained by performing a simulation analysis using the finite element method, regarding the relationship between the frequency of the air resonance generated in a gap between the diaphragm and a resonance plate and the dimension of the width of the resonance plate.

FIG. 12 is a graph obtained by performing a simulation analysis using the finite element method, regarding the relationship between the frequency of the air resonance generated in the gap between the diaphragm and the resonance plate and the dimension of the width of the resonance plate. In FIG. 12, the vertical axis represents the frequency (kHz) of the air resonance occurring in the gap Rg between the diaphragm 110 and the resonance plate 140, and the horizontal axis represents the dimension of the width of the resonance plate 140 (mm).

As shown in FIG. 12, the frequency of the air resonance decreases as the width of the resonance plate 140 in the first direction (X-axis direction) increases. This is because as the width of the resonance plate 140 in the first direction (X-axis direction) becomes wider, the length of λ/2 of the air resonance becomes longer, and thus the value of the frequency of the air resonance obtained by dividing the acoustic velocity of the air by λ/2 becomes smaller.

Figure 13:
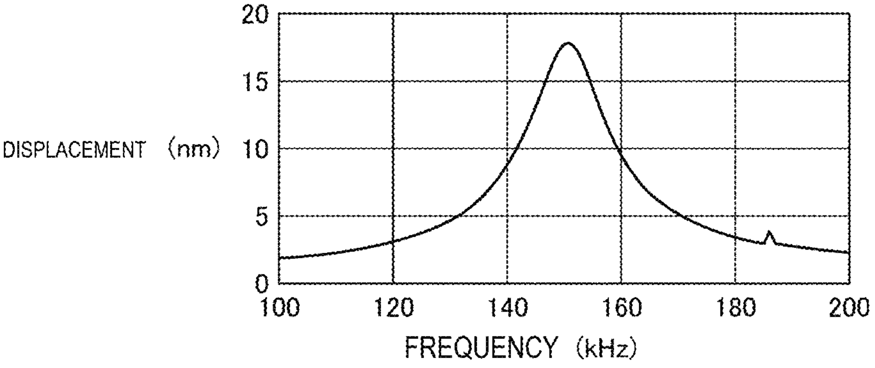
FIG. 13 is a graph obtained by performing a simulation analysis using the finite element method, regarding the relationship between the frequency of the diaphragm and the ultrasonic vibrator and the displacement of the diaphragm.

FIG. 13 is a graph obtained by performing a simulation analysis using the finite element method, regarding the relationship between the frequency of the diaphragm and the ultrasonic vibrator and the displacement of the diaphragm. In FIG. 13, the vertical axis represents the displacement (nm) of the diaphragm 110 and the horizontal axis represents the frequency (kHz) of the diaphragm 110 and the ultrasonic vibrator 130. In the example shown in FIG. 13, the displacement of the diaphragm 110 is greatest when the frequency of the diaphragm 110 and the ultrasonic vibrator 130 is about 150 kHz, indicating that the resonance frequency of the diaphragm 110 and the ultrasonic vibrator 130 is about 150 KHz. The resonance frequency of the diaphragm 110 and the ultrasonic vibrator 130 varies with the thickness of the diaphragm 110 and the width of the diaphragm 110 in the first direction (X-axis direction).

Figure 14:
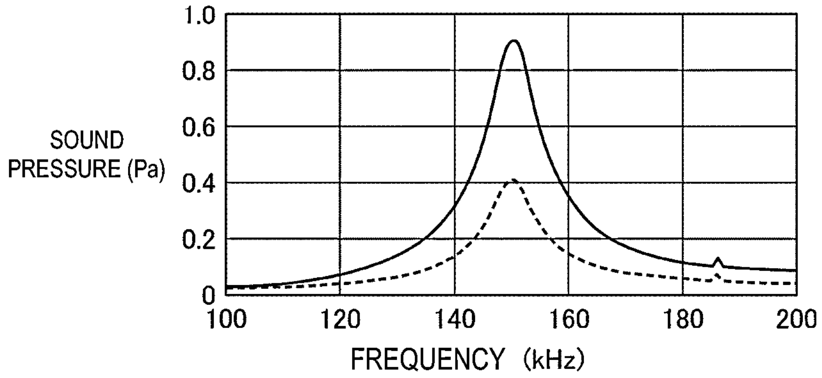
FIG. 14 is a graph obtained by performing a simulation analysis using the finite element method in an ultrasonic transducer obtained by combining a resonance plate whose air resonance frequency is about 150 kHz with a diaphragm and ultrasonic vibrator whose resonance frequency is about 150 KHz, regarding the relationship between the sound pressure of the ultrasonic wave transmitted from the ultrasonic transducer and the frequency of the diaphragm and the ultrasonic vibrator.

FIG. 14 is a graph obtained by performing a simulation analysis using the finite element method in an ultrasonic transducer obtained by combining a resonance plate whose air resonance frequency is about 150 kHz with a diaphragm and ultrasonic vibrator whose resonance frequency is about 150 kHz, regarding the relationship between the sound pressure of the ultrasonic wave transmitted from the ultrasonic transducer and the frequency of the diaphragm and the ultrasonic vibrator. In FIG. 14, the vertical axis represents the sound pressure (Pa) of the ultrasonic wave transmitted from the ultrasonic transducer 100, and the horizontal axis represents the frequency (KHz) of the diaphragm 110 and the ultrasonic vibrator 130. In FIG. 14, the data for an ultrasonic transducer provided with the resonance plate is indicated by a solid line, and the data for an ultrasonic transducer not provided with the resonance plate is indicated by a dotted line. The sound pressure is the value of the sound pressure at a point about 30 cm away from the front of the ultrasonic transducer in the third direction (Z-axis direction).

As shown in FIG. 14, the ultrasonic transducer which is provided with the resonance plate 140 and in which the air resonance occurs at a frequency substantially the same as the resonance frequency of the diaphragm 110 and the ultrasonic vibrator 130 can radiate an ultrasonic wave at a higher sound pressure compared to the ultrasonic transducer which is not provided with the resonance plate.

Figure 15:
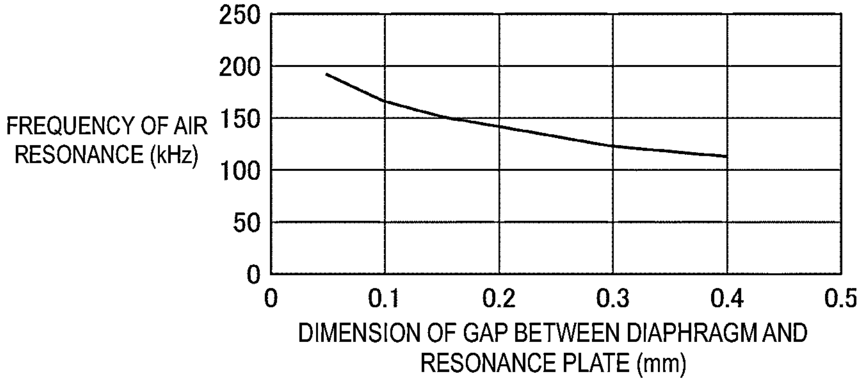
FIG. 15 is a graph obtained by performing a simulation analysis using the finite element method, regarding the relationship between the frequency of the air resonance generated in the gap between the diaphragm and resonance plate and the dimension of the gap between the diaphragm and the resonance plate.

FIG. 15 is a graph obtained by performing a simulation analysis using the finite element method, regarding the relationship between the frequency of the air resonance generated in the gap between the diaphragm and resonance plate and the dimension of the gap between the diaphragm and the resonance plate. In FIG. 12, the vertical axis represents the frequency (kHz) of the air resonance occurring in the gap Rg between the diaphragm 110 and the resonance plate 140, and the horizontal axis represents the dimension (mm) of the gap Rg between the diaphragm 110 and the resonance plate 140 in the third direction (Z-axis direction).

As shown in FIG. 15, the frequency of the air resonance increases as the dimension of the gap Rg between the diaphragm 110 and the resonance plate 140 in the third direction (Z-axis direction) decreases. The reason for this is explained below. The smaller the dimension of the gap Rg between the diaphragm 110 and the resonance plate 140 in the third direction (Z-axis direction), the smaller the volume of the gap Rg. According to the Boyle-Charles' law, the smaller the volume of the gap Rg between the diaphragm 110 and the resonance plate 140, the greater the change in pressure with respect to the displacement of the diaphragm 110. When the dimension of the gap Rg between the diaphragm 110 and the resonance plate 140 in the third direction (Z-axis direction) is small, the air compressed between the diaphragm 110 and the resonance plate 140 by the displacement of the diaphragm 110 becomes harder, and the acoustic velocity of this air increases. Therefore, the smaller the dimension of the gap Rg between the diaphragm 110 and the resonance plate 140 in the third direction (Z-axis direction), the higher the acoustic velocity of the air located in the gap Rg, and the higher the frequency of the air resonance even if the λ/2 length of the air resonance is constant.

Figure 16:
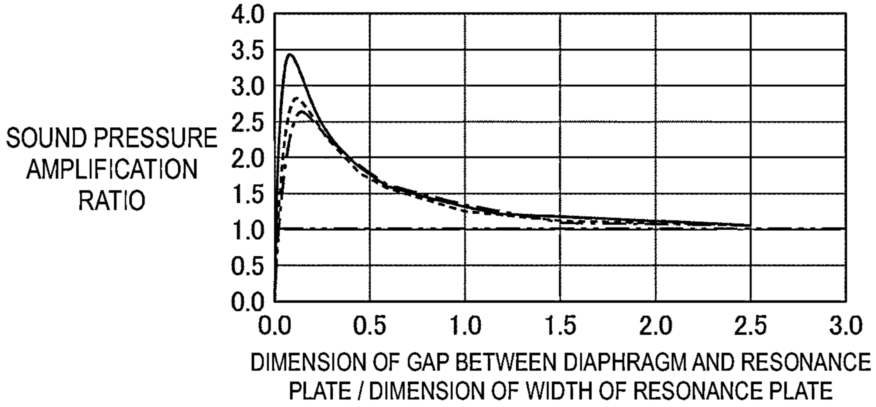
FIG. 16 is a graph obtained by performing a simulation analysis using the finite element method, regarding the relationship between the ratio of the dimension of the gap between the diaphragm and the resonance plate to the width of the resonance plate, and the sound pressure amplification ratio.

Next, the conditions under which a λ/2 air resonance effectively occurs in the first direction (X-axis direction) are described in detail. FIG. 16 is a graph obtained by performing a simulation analysis using the finite element method, regarding the relationship between the ratio of the dimension of the gap between the diaphragm and the resonance plate to the width of the resonance plate, and the sound pressure amplification ratio. In FIG. 16, the vertical axis represents the sound pressure amplification ratio, and the horizontal axis represents the ratio of the dimension (mm) of the gap Rg between the diaphragm 110 and the resonance plate 140 in the third direction (Z-axis direction) to the dimension of the width of the resonance plate 140 in the first direction (X-axis direction). In FIG. 16, the resonance frequency of the diaphragm 110 and the ultrasonic vibrator 130, and the frequency of the air resonance occurring in the gap between the diaphragm 110 and the resonance plate 140 are each indicated by a solid line for data at about 150 kHz, by a dotted line for data at 100 kHz, and by a one-dot chain line for data at about 80 KHz.

For example, when the frequency of the air resonance occurring in the gap between the diaphragm 110 and the resonance plate 140 is about 80 kHz, since the dimension of the width of the resonance plate 140 in the first direction (X-axis direction) is about 1.8 mm when the dimension of the gap Rg between the diaphragm 110 and the resonance plate 140 in the third direction (Z-axis direction) is about 0.1 mm, the ratio of the dimension of the gap Rg in the third direction (Z-axis direction) to the dimension of the width of the resonance plate 140 in the first direction (X-axis direction) is about 0.1/1.8=0.056. When the resonance frequency of the diaphragm 110 and the ultrasonic vibrator 130 is 80 kHz, the value of the sound pressure at a point about 30 cm away, in the third direction (Z-axis direction), from the front face of the ultrasonic transducer not provided with the resonance plate 140 is about 0.276 Pa, while the value of the sound pressure at a point about 30 cm away, in the third direction (Z-axis direction), from the front surface of the ultrasonic transducer provided with the resonance plate 140, in which the ratio of the dimension of the gap Rg in the third direction (Z-axis direction) to the dimension of the width of the resonance plate 140 is about 0.056 in the first direction (X-axis direction), is about 0.522 Pa, for example. Therefore, the sound pressure amplification ratio is about 0.522/0.276=1.89, for example.

As shown in FIG. 16, when the ratio of the dimension of the gap Rg in the third direction (Z-axis direction) to the dimension of the width of the resonance plate 140 in the first direction (X-axis direction) is less than 1, that is, when the dimension of the resonance plate 140 in the lateral direction is larger than the dimension of the gap Rg in the direction perpendicular or substantially perpendicular to the diaphragm 110, the effect of increasing the sound pressure of the ultrasonic wave radiated from the ultrasonic transducer at all of the three frequencies is obtained. When the dimension of the resonance plate 140 in the lateral direction is about 2.5 times or more and about 5 times or less the dimension of the gap Rg in the direction perpendicular or substantially perpendicular to the diaphragm 110, for example, the effect of increasing the sound pressure of the ultrasonic wave radiated from the ultrasonic transducer by two or more times is achieved.

On the other hand, if the dimension of the gap Rg in the third direction (Z-axis direction) becomes too small, the push-back force due to the air resonance and the air compression increases when the diaphragm 110 is displaced is increased, so that the displacement of the diaphragm 110 becomes small.

Therefore, as shown in FIG. 16, the sound pressure amplification ratio is low in a range where the ratio of the dimension of the gap Rg in the third direction (Z-axis direction) to the dimension of the width of the resonance plate 140 in the first direction (X-axis direction) is about 0.1 or less, for example.

By generating a suitable amount of the push-back force due to the air resonance and the air compression when the diaphragm 110 is displaced, the amplitude of the diaphragm 110 can be reduced, and the internal stress in the third direction (Z-axis direction) generated in the ultrasonic transducer 100 against the radiated sound pressure can be reduced. In other words, the internal stress in the third direction (Z-axis direction) generated in the ultrasonic transducer 100 can be reduced while maintaining the sound pressure of the ultrasonic wave radiated from the ultrasonic transducer 100.

Figure 17:
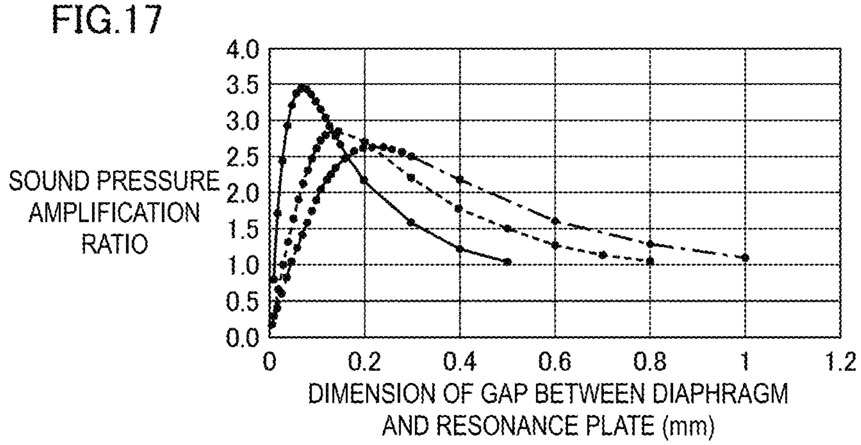
FIG. 17 is a graph obtained by performing a simulation analysis using the finite element method, regarding the relationship between the dimension of the gap between the diaphragm and the resonance plate and the sound pressure amplification ratio.

FIG. 17 is a graph obtained by performing a simulation analysis using the finite element method, regarding the relationship between the dimension of the gap between the diaphragm and the resonance plate and the sound pressure amplification ratio. In FIG. 17, the vertical axis represents the sound pressure amplification ratio and the horizontal axis represents the dimension (mm) of the gap Rg between the diaphragm 110 and the resonance plate 140 in the third direction (Z-axis direction). In FIG. 17, the resonance frequency of the diaphragm 110 and the ultrasonic vibrator 130, and the frequency of the air resonance occurring in the gap between the diaphragm 110 and the resonance plate 140 are each indicated by a solid line for data at about 150 kHz, by a dotted line for data at about 100 kHz, and by a one-dot chain line for data at about 80 KHz, for example.

As shown in FIG. 17, the higher each of the resonance frequency of the diaphragm 110 and the ultrasonic vibrator 130 and the frequency of the air resonance, the more the peak of the sound pressure amplification ratio shifts toward the smaller dimension of the gap Rg in the third direction (Z-axis direction). Specifically, the resonance frequency of the diaphragm 110 and the ultrasonic vibrator 130 and the frequency of the air resonance each have a peak of sound pressure amplification ratio at 80 kHz when the dimension of the gap Rg in the third direction (Z-axis direction) is around 0.2 mm, at about 100 kHz when the dimension of the gap Rg in the third direction (Z-axis direction) is around 0.15 mm, and at about 150 kHz when the dimension of the gap Rg in the third direction (Z-axis direction) is around 0.07 mm, for example. From these results, it is possible to bring the sound pressure amplification ratio close to the peak value by changing the dimension of the gap Rg in the third direction (Z-axis direction) according to the resonance frequency of the diaphragm 110 and the ultrasonic vibrator 130 and the frequency of the air resonance.

Figure 18:
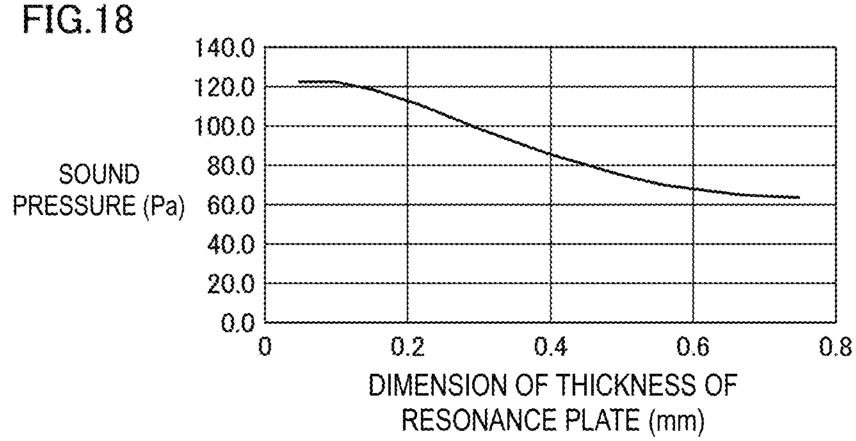
FIG. 18 is a graph obtained by performing a simulation analysis using the finite element method, regarding the relationship between the sound pressure of the ultrasonic wave transmitted from the ultrasonic transducer and the dimension of the thickness of the resonance plate.

The thickness of the resonance plate 140 included in the ultrasonic transducer 100 according to an example embodiment of the present invention is described below. FIG. 18 is a graph obtained by performing a simulation analysis using the finite element method, regarding the relationship between the sound pressure of the ultrasonic wave transmitted from the ultrasonic transducer and the dimension of the thickness of the resonance plate. In FIG. 18, the vertical axis represents the sound pressure (Pa) of the ultrasonic wave transmitted from the ultrasonic transducer 100, and the horizontal axis represents the dimension of the thickness of the resonance plate 140 (mm). The sound pressure is the value of the sound pressure at a point about 30 cm away from the front of the ultrasonic transducer in the third direction (Z-axis direction). As shown in FIG. 18, the sound pressure of the ultrasonic wave transmitted from the ultrasonic transducer 100 decreases as the resonance plate 140 becomes thicker.

Figure 19:
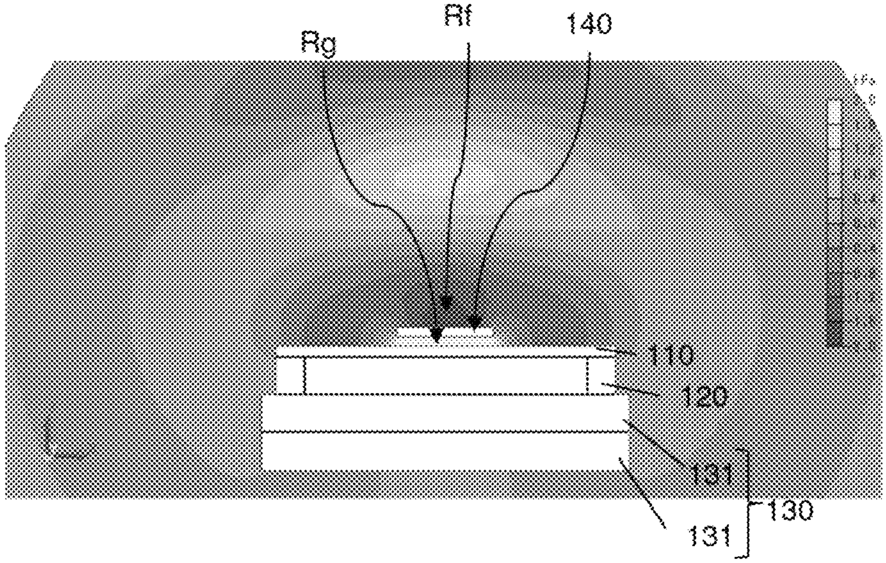
FIG. 19 is a view showing a sound pressure distribution obtained by performing a simulation analysis using the finite element method, when a λ/2 air resonance occurs in an ultrasonic transducer with a resonance plate whose thickness dimension is about 0.1 mm.
Figure 20:
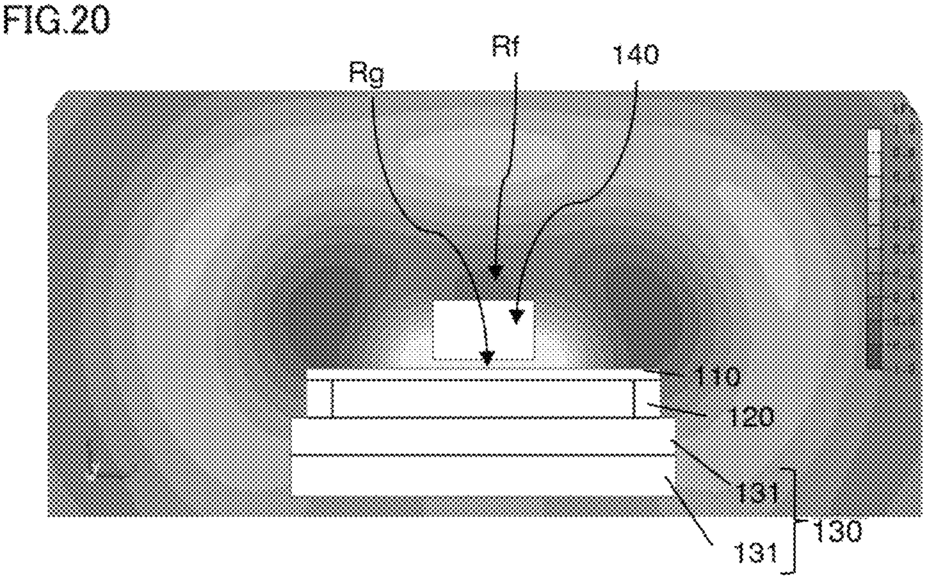
FIG. 20 is a view showing a sound pressure distribution obtained by performing a simulation analysis using the finite element method, when a λ/2 air resonance occurs in an ultrasonic transducer with a resonance plate whose thickness dimension is about 0.6 mm.

FIG. 19 is a view showing a sound pressure distribution obtained by performing a simulation analysis using the finite element method, when a $\lambda/2$ air resonance occurs in an ultrasonic transducer with a resonance plate whose thickness dimension is about 0.1 mm, for example. FIG. 20 is a view showing a sound pressure distribution obtained by performing a simulation analysis using the finite element method, when a $\lambda/2$ air resonance occurs in an ultrasonic transducer with a resonance plate whose thickness dimension is about 0.6 mm, for example.

As shown in FIG. 19, when the dimension of the resonance plate thickness is about 0.1 mm, a virtual sound source is concentrated in the region Rf directly above the resonance plate 140. However, as shown in FIG. 20, when the dimension of the resonance plate 140 thickness is about 0.6 mm, for example, the virtual sound source is distributed above the resonance plate 140, so that the frontal sound pressure becomes low. In other words, as the resonance plate 140 becomes thicker, when a $\lambda/2$ air resonance is occurring, the air flow in and out a region with the region Rf directly above the resonance plate 140 as the center becomes weaker, so that the effect of superimposing sound pressure by the virtual sound source becomes weaker. Therefore, the dimension of the thickness of the resonance plate 140 is preferably about 0.3 mm or less, for example. If the thickness of the resonance plate 140 is less than about 0.05 mm, since the rigidity of the resonance plate 140, even if it is made of a highly rigid metal such as stainless steel, becomes small, causing the resonance plate 140 to warp or the like, so that it becomes difficult to accurately secure the gap between the diaphragm 110 and the resonance plate, and also since there is the possibility of unwanted vibrations due to air being pushed back by the resonance becomes higher, it is preferred that the thickness of the resonance plate 140 be about 0.05 mm or more and about 0.3 mm or less, for example.

The ultrasonic transducer 100 according to Example Embodiment 1 of the present invention includes the diaphragm 110, at least one frame 120, at least one ultrasonic vibrator 130, and at least one resonance plate 140. The at least one frame 120 extends in the longitudinal direction and is bonded to the diaphragm 110. The at least one ultrasonic vibrator 130 is attached to the at least one frame 120, respectively, and faces the diaphragm 110 with a space therebetween. The at least one resonance plate 140 extends along the longitudinal direction while facing the diaphragm 110 with the gap Rg therebetween, on a side opposite to the at least one frame 120 with respect to the diaphragm 110. The diaphragm 110 vibrates resonantly in a direction perpendicular or substantially perpendicular to the diaphragm 110, in a phase opposite to the at least one ultrasonic vibrator 130. With regard to the dimension of the inner side portion of the at least one frame in the longitudinal direction, the dimension L1 of the inner side portion of the at least one frame 120 in the longitudinal direction is larger than the dimension L2 of the inner side portion of the at least one frame 120 in the lateral direction perpendicular or substantially perpendicular to the longitudinal direction. When the wavelength converted from the driving frequency of the at least one ultrasonic vibrator 130 is λ, a λ/2 air resonance can occur in the gap Rg in the lateral direction. Thus, in the ultrasonic transducer 100, higher sound pressure level can be achieved with a compact configuration.

In the ultrasonic transducer 100 according to Example Embodiment 1 of the present invention, the dimension L1 of the inner side portion of the at least one frame 120 in the longitudinal direction is about four or more times the dimension L2 of the inner side portion of the at least one frame 120 in the lateral direction perpendicular or substantially perpendicular to the longitudinal direction. Thus, in the ultrasonic transducer 100, higher sound pressure level can be achieved with in a simple and compact configuration.

In the ultrasonic transducer 100 according to Example Embodiment 1 of the present invention, the frequency of the air resonance is within about ±10% of the resonance frequency of the diaphragm 110 and at least one ultrasonic vibrator 130. Thus, the sound pressure due to the air resonance is superimposed on the sound pressure of the ultrasonic wave radiated by the resonance of the diaphragm 110 and the ultrasonic vibrator 130, so that an ultrasonic wave with high sound pressure can be radiated from the ultrasonic transducer 100.

In the ultrasonic transducer 100 according to Example Embodiment 1 of the present invention, the dimension of at least one resonance plate 140 in the lateral direction is larger than the dimension of the gap Rg in the direction perpendicular or substantially perpendicular to the diaphragm 110. Thus, it is possible to reduce the internal stress in the third direction (Z-axis direction) generated in the ultrasonic transducer 100 with respect to the radiated sound pressure, while increasing the sound pressure of the ultrasonic wave radiated from the ultrasonic transducer 100.

In the ultrasonic transducer 100 according to Example Embodiment 1 of the present invention, the dimension of at least one resonance plate 140 in the lateral direction is about 2.5 times or more and about 5 times or less the dimension of the gap Rg in the direction perpendicular or substantially perpendicular to the diaphragm 110, for example. Thus, it is possible to reduce the internal stress in the third direction (Z-axis direction) generated in the ultrasonic transducer 100 with respect to the radiated sound pressure, while increasing the sound pressure of the ultrasonic wave radiated from the ultrasonic transducer 100 by two or more times compared to an ultrasonic transducer not provided with the resonance plate 140.

In the ultrasonic transducer 100 according to Example Embodiment 1 of the present invention, the thickness of at least one resonance plate 140 is about 0.3 mm or less, for example. Thus, the sound pressure due to the air resonance is effectively superimposed on the sound pressure of the ultrasonic wave radiated by the resonance of the diaphragm 110 and the ultrasonic vibrator 130, so that an ultrasonic wave with high sound pressure can be radiated from the ultrasonic transducer 100.

In a parametric speaker provided with the ultrasonic transducer 100 according to Example Embodiment 1 of the present invention, it is possible to reproduce audible sound by modulating the ultrasonic wave radiated from the ultrasonic transducer 100 by a modulation drive of the ultrasonic transducer 100. Examples of modulation methods include AM modulation (amplitude modulation) and FM modulation (frequency modulation).

Example Embodiment 2

An ultrasonic transducer according to Example Embodiment 2 of the present invention is described below with reference to the drawings. The ultrasonic transducer according to Example Embodiment 2 of the present invention differs from the ultrasonic transducer according to Example Embodiment 1 of the present invention in that a plurality of ultrasonic vibrators are arranged in an array, so that description for the configurations similar to those of the ultrasonic transducer according to Example Embodiment 1 of the present invention will not be repeated.

Figure 21:
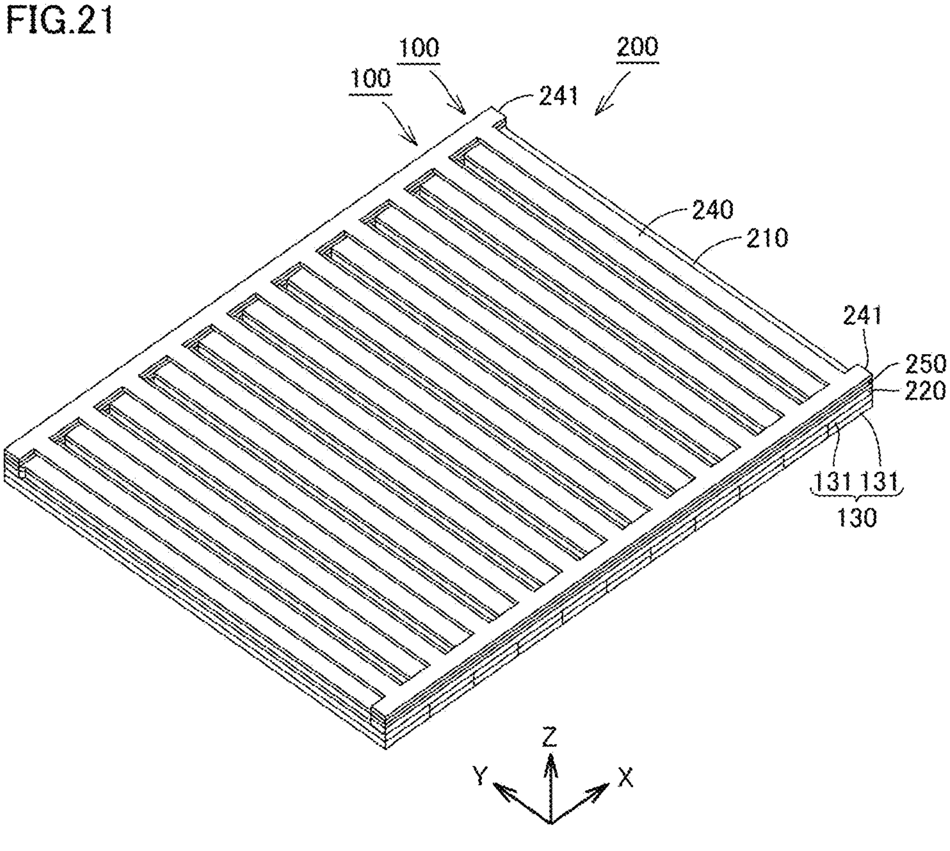
FIG. 21 is a perspective view showing the configuration of an ultrasonic transducer according to Example Embodiment 2 of the present invention.
Figure 22:
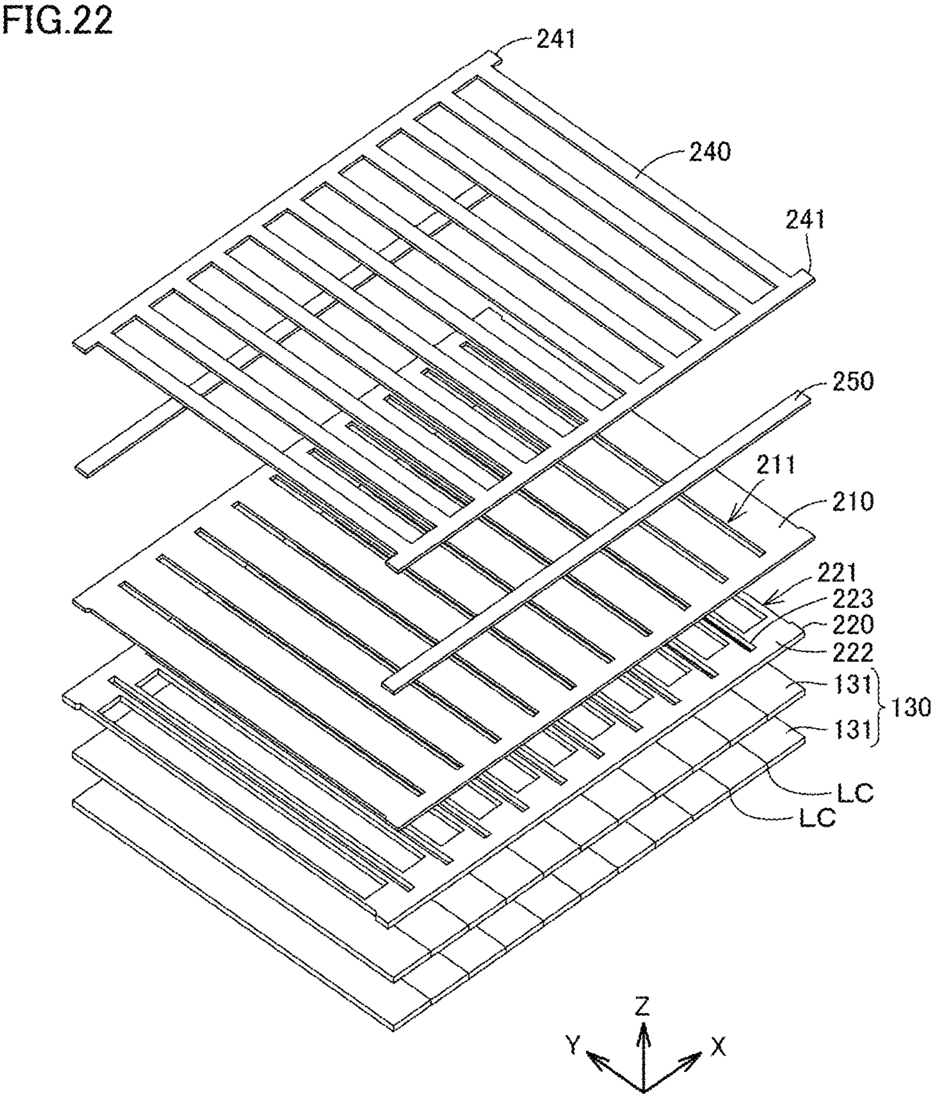
FIG. 22 is an exploded perspective view showing the configuration of the ultrasonic transducer according to Example Embodiment 2 of the present invention.

FIG. 21 is a perspective view showing the configuration of the ultrasonic transducer according to Example Embodiment 2 of the present invention. FIG. 22 is an exploded perspective view showing the configuration of the ultrasonic transducer according to Example Embodiment 2 of the present invention. As shown in FIGS. 21 and 22, in an ultrasonic transducer 200 according to Example Embodiment 2 of the present invention, the ultrasonic transducers 100 according to Example Embodiment 1 arranged in array along the first direction (X-axis direction) is integrally formed. The ultrasonic transducer 200 includes a diaphragm 210, a plurality of frames 220, a plurality of ultrasonic vibrators 130, and a plurality of resonance plates 240. The plurality of frames 220 are bonded to the diaphragm 210, and the plurality of ultrasonic vibrators 130 are respectively bonded to the plurality of frames 220.

The diaphragm 210 has a flat plate shape, and a plurality of slits 211 extending in the second direction (Y-axis direction) are positioned at t intervals in the first direction (X-axis direction). The diaphragm 210 is made of an aluminum alloy such as duralumin containing aluminum, or a metal such as a stainless steel. In the present example embodiment, the diaphragm 210 is made of a stainless steel. The plurality of slits 211 are formed by etching or cutting.

Each of the plurality of frames 220 has a rectangular or substantially rectangular ring shape. Each of the plurality of frames 220 has a lateral direction along the first direction (X-axis direction) and a longitudinal direction along the second direction (Y-axis direction). Each of the plurality of frames 220 extends in the second direction (Y-axis direction). The axial direction of each of the plurality of frames 220 extends along the third direction (Z-axis direction). Each of the plurality of frames 220 has a pair of long side portions 221 extending in the second direction (Y-axis direction) and a pair of short side portions 222 extending in the first direction (X-axis direction). The shortest distance between the long side portions 221 is about four or more times the shortest distance between the short side portions 222, for example. However, the shortest distance between the long side portions 221 is not limited to four or more times the shortest distance between the short side portions 222, as long as it is greater than the shortest distance between the short side portions 222.

The plurality of frames 220 are arranged side by side in the first direction (X-axis direction). A slit 223 is formed between the frames 220 adjacent to each other in the first direction (X-axis direction). The plurality of slits 223 are formed by etching or cutting. In the frames 220 adjacent to each other in the first direction (X-axis direction), the long side portions 221 adjacent to each other are isolated from each other by the slit 223.

The frames 220 adjacent to each other in the first direction (X-axis direction) are connected to each other by the short side portions 222. In other words, in the plurality of frames 220, the frames 220 adjacent to each other in the lateral direction are connected to each other by both mutual end portions in the longitudinal direction.

Each of the plurality of frames 220 is made of a metal such as an aluminum alloy or a stainless steel, glass epoxy, a resin or the like. In the present example embodiment, the plurality of frames 220 are formed from a single thin sheet. However, the present invention is not limited thereto, but includes a case where the short side portions 222 of a plurality of frames 220 respectively formed from a plurality of thin sheets are bonded to each other to make a single peace.

In the present example embodiment, each of the plurality of ultrasonic vibrators 130 includes two piezoelectric bodies 131 laminated on top of each other. The two piezoelectric bodies 131 included in the plurality of ultrasonic vibrators 130 are laminated and bonded together in the form of two thin sheets.

As shown in FIG. 22, the slits 211 and the slits 223 are disposed in the same positions in the first direction (X-axis direction) so that they overlap each other in the third direction (Z-axis direction). The piezoelectric body 131 is cut and divided by a dicer or the like at a plurality of cut lines LC extending in the second direction (Y-axis direction) so as to overlap the slits 211 and slits 223 in the third direction (Z-axis direction).

As shown in FIGS. 21 and 22, two spacers 250 are respectively disposed on node points, where less vibration is generated, of the diaphragm 210. In the present example embodiment, the two spacers 250 are disposed respectively at the end portions of the diaphragm 210 in the second direction (Y-axis direction).

The plurality of resonance plates 240 are arranged at intervals to each other so that they are positioned side by side in the first direction (X-axis direction). In the plurality of resonance plates 240, the resonance plates 240 adjacent to each other in the first direction (X-axis direction) are connected to each other, at both mutual end portions in the second direction (Y-axis direction), by connecting portions 241. Each of the two connecting portions 241 extends in the first direction (X-axis direction) and is positioned on the spacers 250.

Figure 23:
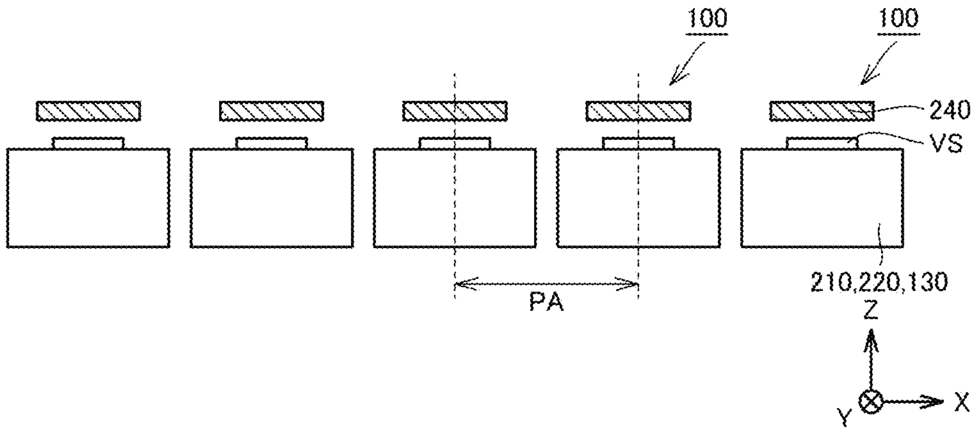
FIG. 23 is a schematic view showing a FEM model of the ultrasonic transducer obtained by performing a simulation analysis.

Here, results obtained by performing a simulation analysis using the finite element method regarding the relationship between an array pitch, which is the arrangement interval between the of the plurality of ultrasonic transducers 100, and the air resonance will be described. FIG. 23 is a schematic view showing a FEM model of the ultrasonic transducer obtained by performing a simulation analysis. A simulation analysis using the finite element method is performed regarding the sound pressure at a point 30 cm away in the third direction (Z-axis direction) from the front face of the ultrasonic transducer 200 including five ultrasonic transducers 100 and the sound pressure distribution around the ultrasonic transducer 200, when an array pitch PA shown in FIG. 23, which is the interval between the ultrasonic transducers 100 adjacent to each other in the first direction (X-axis direction), is changed; wherein, as simulation analysis conditions, the simulation analysis is performed in a state where the vibration source VS located at the interface of the diaphragm 210 with the air in the gap between the diaphragm 210 and the resonance plate 240 is vibrating in the third direction (Z-axis direction) at a speed of about 1 m/s, for example. The frequency of the air resonance was set to about 150 kHz and the width of the resonance plate 140 in the first direction (X-axis direction) was set to about 0.9 mm, for example.

Figure 24:
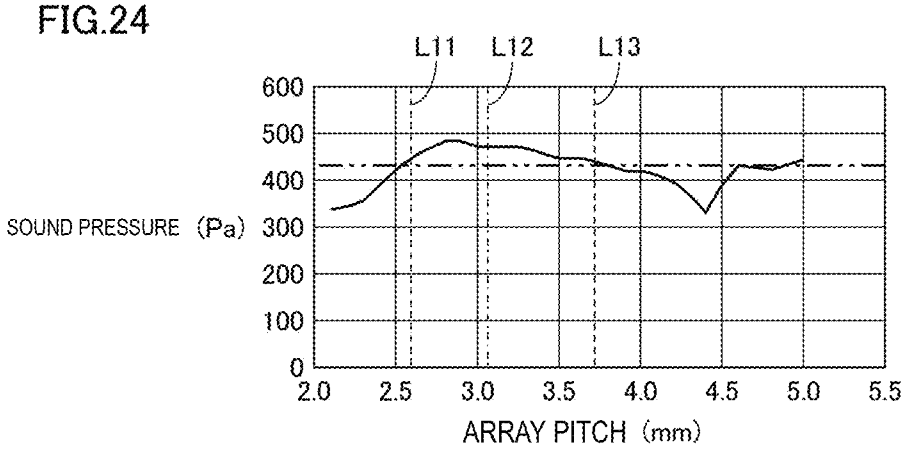
FIG. 24 is a graph obtained by performing a simulation analysis using the finite element method, regarding the relationship between the sound pressure of the ultrasonic wave transmitted from the ultrasonic transducer and an array pitch.

FIG. 24 is a graph obtained by performing a simulation analysis using the finite element method, regarding the relationship between the sound pressure of the ultrasonic wave transmitted from the ultrasonic transducer and the array pitch. In FIG. 24, the vertical axis represents the sound pressure (Pa) of the ultrasonic wave transmitted from the ultrasonic transducer 200, and the horizontal axis represents the array pitch (mm). The sound pressure shows the value of the sound pressure at a point 30 cm away in the third direction (Z-axis direction) from the front of the ultrasonic transducer 200. In FIG. 24, the reference sound pressure indicated by the two-dot chain line is obtained by multiplying the sound pressure at a point about 30 cm away in the third direction (Z-axis direction) from the front of one ultrasonic transducer 100 by 5.

When the sound pressure of the ultrasonic wave transmitted from the ultrasonic transducer 200 is higher than the reference sound pressure, the sound pressure is being mutually intensified by the arraying of the ultrasonic transducer 100. When the sound pressure of the ultrasonic wave transmitted from the ultrasonic transducer 200 is lower than the reference sound pressure, the sound pressure is being mutually weakened by the arraying of the ultrasonic transducer 100.

Figure 25:
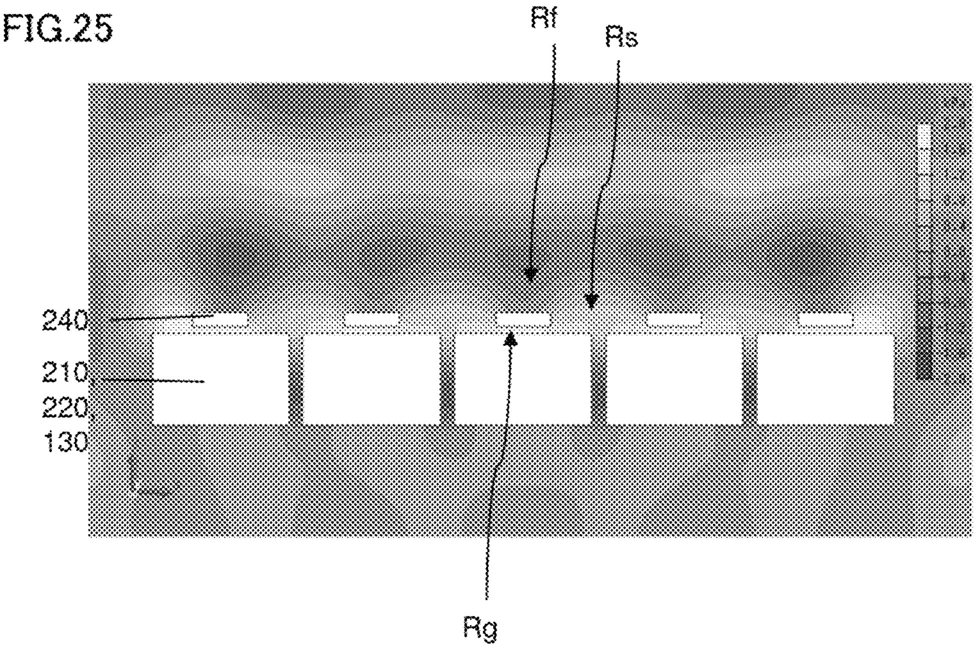
FIG. 25 is a view showing a sound pressure distribution obtained by performing a simulation analysis using the finite element method, around the ultrasonic transducer when the array pitch is about 2.2 mm.
Figure 26:
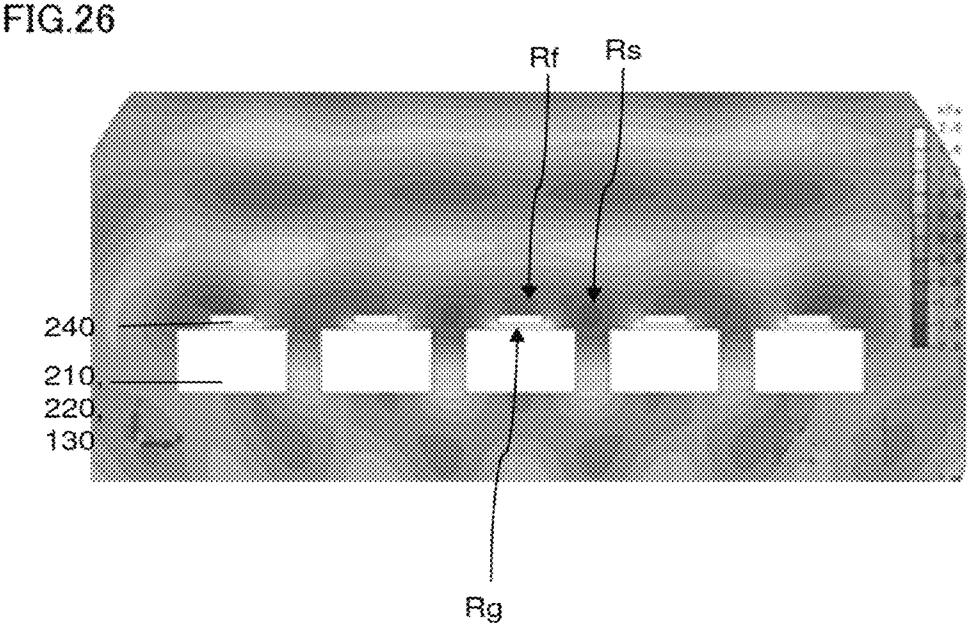
FIG. 26 is a view showing a sound pressure distribution obtained by performing a simulation analysis using the finite element method, around the ultrasonic transducer when the array pitch is about 2.6 mm.
Figure 27:
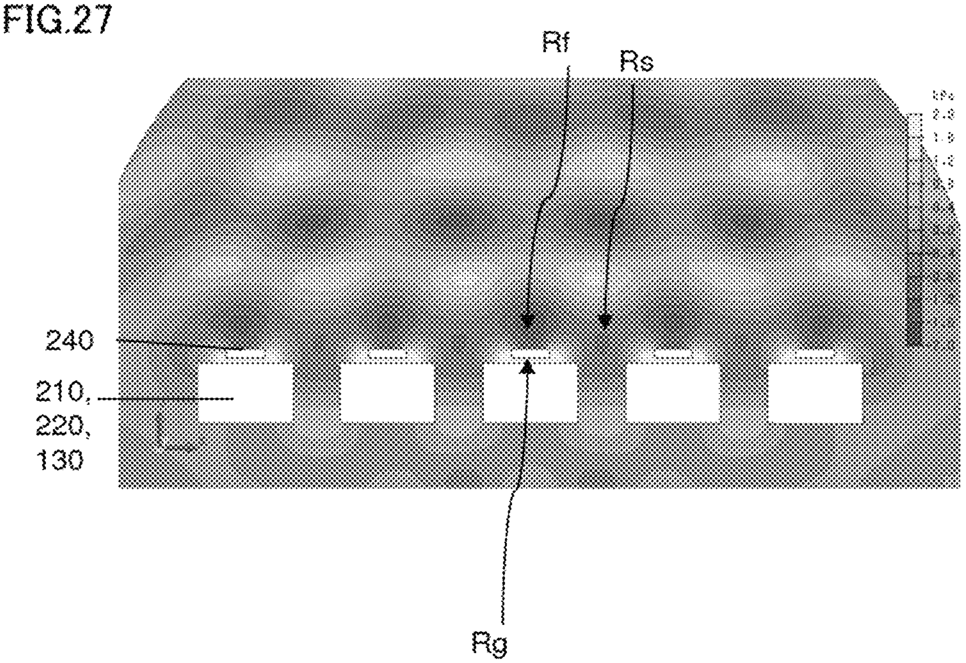
FIG. 27 is a view showing a sound pressure distribution obtained by performing a simulation analysis using the finite element method, around the ultrasonic transducer when the array pitch is about 3.0 mm.
Figure 28:
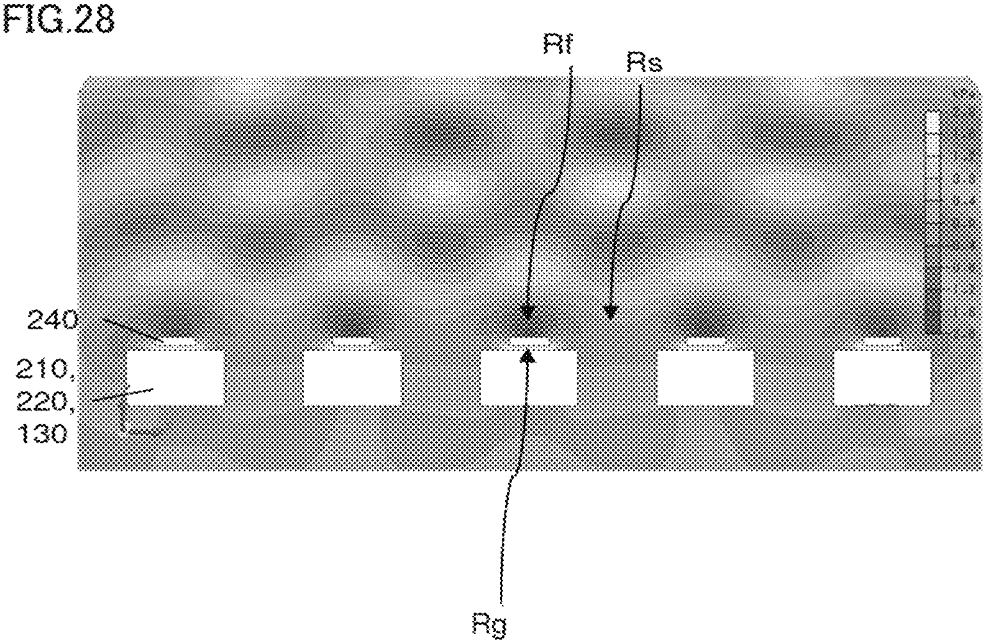
FIG. 28 is a view showing a sound pressure distribution obtained by performing a simulation analysis using the finite element method, around the ultrasonic transducer when the array pitch is about 3.6 mm.
Figure 29:
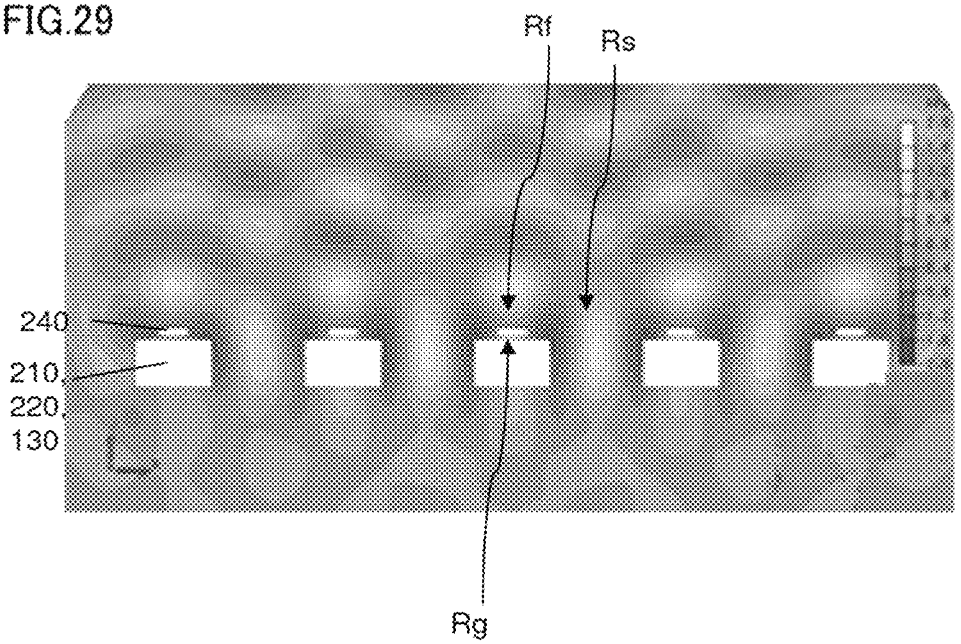
FIG. 29 is a view showing a sound pressure distribution obtained by performing a simulation analysis using the finite element method, around the ultrasonic transducer when the array pitch is about 4.4 mm.

FIG. 25 is a view showing a sound pressure distribution obtained by performing a simulation analysis using the finite element method, around the ultrasonic transducer when the array pitch is about 2.2 mm, for example. FIG. 26 is a view showing a sound pressure distribution obtained by performing a simulation analysis using the finite element method, around the ultrasonic transducer when the array pitch is about 2.6 mm, for example. FIG. 27 is a view showing a sound pressure distribution obtained by performing a simulation analysis using the finite element method, around the ultrasonic transducer when the array pitch is about 3.0 mm, for example. FIG. 28 is a view showing the sound pressure distribution obtained by performing a simulation analysis using the finite element method, around the ultrasonic transducer when the array pitch is about 3.6 mm, for example. FIG. 29 is a view showing a sound pressure distribution obtained by performing a simulation analysis using the finite element method, around the ultrasonic transducer when the array pitch is about 4.4 mm, for example.

As shown in FIG. 25, when the array pitch is too narrow at about 2.2 mm, the belly of the sound pressure at the gap Rg between the diaphragm 210 and the resonance plate 240 is extended in the first direction (X-axis direction) and collapsed, and no air resonance occurs, so the region Rs of the gap between the resonance plates 240 adjacent to each other and the region Rg are substantially white. Therefore, as shown in FIG. 24, the sound pressure of the ultrasonic wave transmitted from the ultrasonic transducer 200 is lower than the reference sound pressure.

As shown in FIG. 26, when the array pitch is about 2.6 mm, for example, the gap Rg is white and the region Rs is black, and air resonance is beginning to occur. Therefore, as shown in FIG. 24, the sound pressure of the ultrasonic wave transmitted from the ultrasonic transducer 200 is slightly higher than the reference sound pressure.

As shown in FIG. 27, when the array pitch is about 3.0 mm, for example, the gap Rg is white and the region Rs is black, and the region Rf directly above the resonance plate 140 is also black, forming a virtual sound source in the region Rf. Therefore, as shown in FIG. 24, the sound pressure of the ultrasonic wave transmitted from the ultrasonic transducer 200 is high to near the peak.

As shown in FIG. 28, when the array pitch is about 3.6 mm, for example, the air resonance in each of the ultrasonic transducers 100 have little interaction with each other. Therefore, as shown in FIG. 24, the sound pressure of the ultrasonic wave transmitted from the ultrasonic transducer 200 is slightly higher than the reference sound pressure.

As shown in FIG. 29, when the array pitch is about 4.4 mm, for example, the gap Rg and the region Rs are white, and the region between the gap Rg and the region Rs is black; the sound pressure of the ultrasonic wave transmitted from the ultrasonic transducers 100 adjacent to each other cancel each other out, reducing the frontal sound pressure to cause air resonance. Therefore, as shown in FIG. 24, the sound pressure of the ultrasonic wave transmitted from the ultrasonic transducer 200 is lower than the reference sound pressure.

Figure 30:
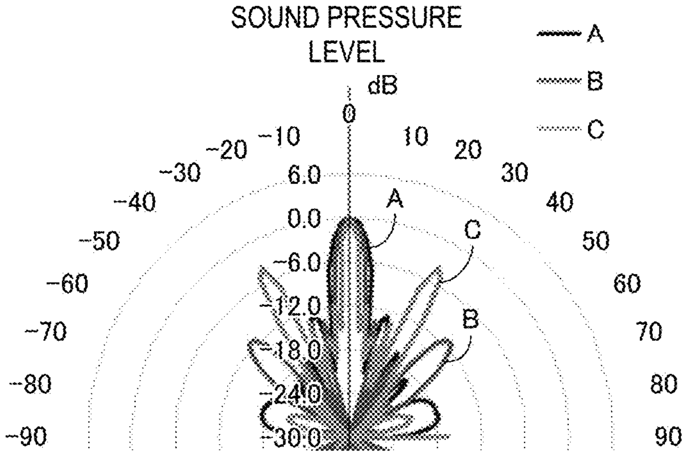
FIG. 30 is a graph obtained by performing a simulation analysis using the finite method, regarding the relationship between the directivity of the ultrasonic wave transmitted from ultrasonic transducers and the array pitch.

FIG. 30 is a graph obtained by performing a simulation analysis using the finite element method, regarding the relationship between the directivity of the ultrasonic wave transmitted from ultrasonic transducers and the array pitch. In FIG. 30, the vertical axis represents the sound pressure level (dB) of the ultrasonic wave transmitted from the ultrasonic transducer 200, and the semicircle represents the directional angle. Example data with an array pitch of about 2.2 mm is indicated by the line A, data with an array pitch of about 3.0 mm is indicated by the line B, and data with an array pitch of about 4.8 mm is indicated by the line C.

As shown in FIG. 30, the larger the array pitch, the more the sidelobes appear on the front side while increasing in size. In other words, if the array pitch becomes too large, the radiation efficiency of the ultrasonic wave to the front of the ultrasonic transducer 200 will decrease.

Based on the above, the range bounded by the dotted line L11 and the dotted line L13 shown in FIG. 24 is suitable as the range where the sound pressure of the ultrasonic wave transmitted from the ultrasonic transducer 200 is higher than the reference sound pressure while reducing or preventing the decrease in the radiation efficiency of the ultrasonic wave to the front of the ultrasonic transducer 200. If the dimension of the resonance plate 240 in the first direction (X-axis direction) is Ds, the wavelength of the ultrasonic wave in air is Aa, and the array pitch, which is the arrangement pitch of the ultrasonic vibrators 130 in the first direction (X-axis direction), is PA, then the relationship $Ds+3\lambda a/4 \le PA \le Ds+5\lambda a/4$ needs to be satisfied to fall within such a suitable range.

For example, when the frequency of the air resonance is about 150 kHz and the width of the resonance plate 140 in the first direction (X-axis direction) is about 0.9 mm, the suitable range is a range where the dotted line L11 shown in FIG. 24 that satisfies the array pitch $PA=Ds+\lambda a-\lambda a/4=Ds+3\lambda a/4=2.6$ mm is a lower limit and the dotted line L13 shown in FIG. 24 that satisfies the array pitch $PA=Ds+\lambda a+\lambda a/4=Ds+5\lambda a/4=3.7$ mm is a upper limit, with the one-dot chain line L12 shown in FIG. 24 that satisfies the array pitch $PA=Ds+\lambda a=3.16$ mm as the center, for example. It has been confirmed that when the relationship $Ds+3\lambda a/4 \le PA \le Ds+5\lambda a/4$ is satisfied, even if the dimension of the gap between the diaphragm 110 and the resonance plate 240 in the third direction (Z-axis direction) is doubled and the width of the resonance plate 140 in the first direction (X-axis direction) is changed to change the resonance frequency, the sound pressure of the ultrasonic wave transmitted from the ultrasonic transducer 200 can be higher than the reference sound pressure while reducing or preventing the decrease in the radiation efficiency of the ultrasonic wave to the front of the ultrasonic transducer 200.

Figure 31:
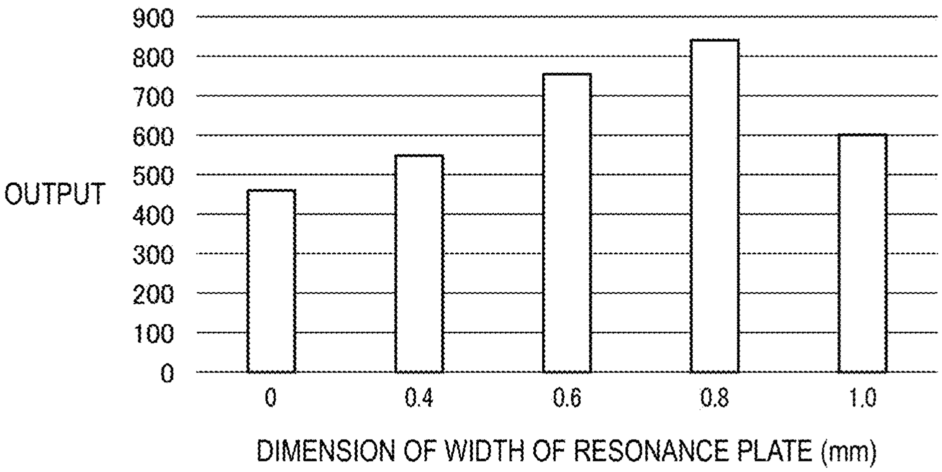
FIG. 31 is a graph showing the actual measured output of the ultrasonic wave radiated from the ultrasonic transducer with different dimension of the width of the resonance plate.

FIG. 31 is a graph showing the actual measured output of the ultrasonic wave radiated from the ultrasonic transducer with different dimension of the width of the resonance plate. In FIG. 31, the vertical axis represents the output and the horizontal axis represents the dimension (mm) of the width of the resonance plate. In FIG. 31, the data for the dimension of 0 of the width of the resonance plate is the data when the resonance plate is not provided. The resonance frequency of the diaphragm 110 and the ultrasonic vibrator 130 is about 141 kHz, the dimension of the gap between the diaphragm 110 and the resonance plate 240 in the third direction (Z-axis direction) is about 0.2 mm, and the array pitch is about 2.8 mm, for example.

As shown in FIG. 31, when the dimension of the width of the resonance plate 240 in the first direction (X-axis direction) was about 0.8 mm, for example, the output was about twice as large as when the resonance plate was not provided. It can be confirmed from these results that the ultrasonic transducer 200 according to the present example embodiment can radiate an ultrasonic wave with a higher output compared to an ultrasonic transducer not provided with a resonance plate.

In a parametric speaker provided with the ultrasonic transducer 200 according to Example Embodiment 2 of the present invention, it is possible to reproduce audible sound by modulating the ultrasonic wave radiated from the ultrasonic transducer 200 by a modulation drive of the ultrasonic transducer 200.

In a parametric speaker provided with the ultrasonic transducer 200 according to the present example embodiment which transmits a high-frequency ultrasonic wave of about 100 KHz or higher, it is possible to reproduce audible sound only in a limited space by reducing or preventing sound reaching unnecessarily far distance and sound leakage due to unnecessary reflection. High-frequency ultrasonic waves above about 100 kHz are outside the audible range of animals such as dog or cat, so that the effect on these animals can be reduced or prevented.

To ensure that audible sound attenuates outside a propagation distance of about 30 cm, the Rayleigh distance must be within about 30 cm, for example. The Rayleigh distance R0 satisfies the relationship $R0=(k\times a^2)/2$. k is the wavenumber and a is the radius of the sound source. Therefore, if the acoustic velocity of air is about 340 m/s, the longitudinal dimension of the vibration region of the diaphragm 210 is about 36 mm or less when the frequency of the ultrasonic wave is about 100 kHz, the longitudinal dimension of the vibration region of the diaphragm 210 is about 29.4 mm or less when the frequency of the ultrasonic wave is about 150 kHz, and the longitudinal dimension of the vibration region of the diaphragm 210 is about 25.5 mm or less when the frequency of the ultrasonic wave is about 200 kHz, for example. When the frequency of the ultrasonic waves is about 100 kHz or higher, the longitudinal dimension L1 is about 4 times or more and about 24 times or less the lateral dimension L2.

In the ultrasonic transducer 200 according to Example Embodiment 2 of the present invention, at least one frame 220 is bonded to the diaphragm 210 arranged in a plurality side by side in the lateral direction. In the at least one frame 220, the frames 220 adjacent to each other in the lateral direction are connected to each other at both mutual end portions in the longitudinal direction. The at least one resonance plate 240 is arranged in a plurality side by side in the lateral direction. In at least one resonance plate 240, the resonance plates 240 adjacent to each other in the lateral direction are connected to each other at both mutual end portions in the longitudinal direction. Thus, the sound pressure level can be easily increased.

In the ultrasonic transducer 200 according to Example Embodiment 2 of the present invention, if the dimension of the at least one resonance plate 240 in the lateral direction is Ds, the wavelength of the ultrasonic wave in air is λa, and the arrangement pitch of the at least one ultrasonic vibrator 130 in the lateral direction is PA, then the relationship $Ds+3\lambda a/4 \leq PA \leq Ds+5\lambda a/4$ is satisfied. Thus, the sound pressure of the ultrasonic wave transmitted from the ultrasonic transducer 200 can be increased, while reducing or preventing the decrease in the radiation efficiency of the ultrasonic wave to the front of the ultrasonic transducer 200.

Example Embodiment 3

An ultrasonic transducer according to Example Embodiment 3 of the present invention is described below with reference to the drawings. The ultrasonic transducer according to Example Embodiment 3 of the present invention differs from the ultrasonic transducer according to Example Embodiment 1 of the present invention in that a slit is formed in the diaphragm, so that description for the configurations similar to those ultrasonic transducer according to Example Embodiment 1 of the present invention will not be repeated.

Figure 32:
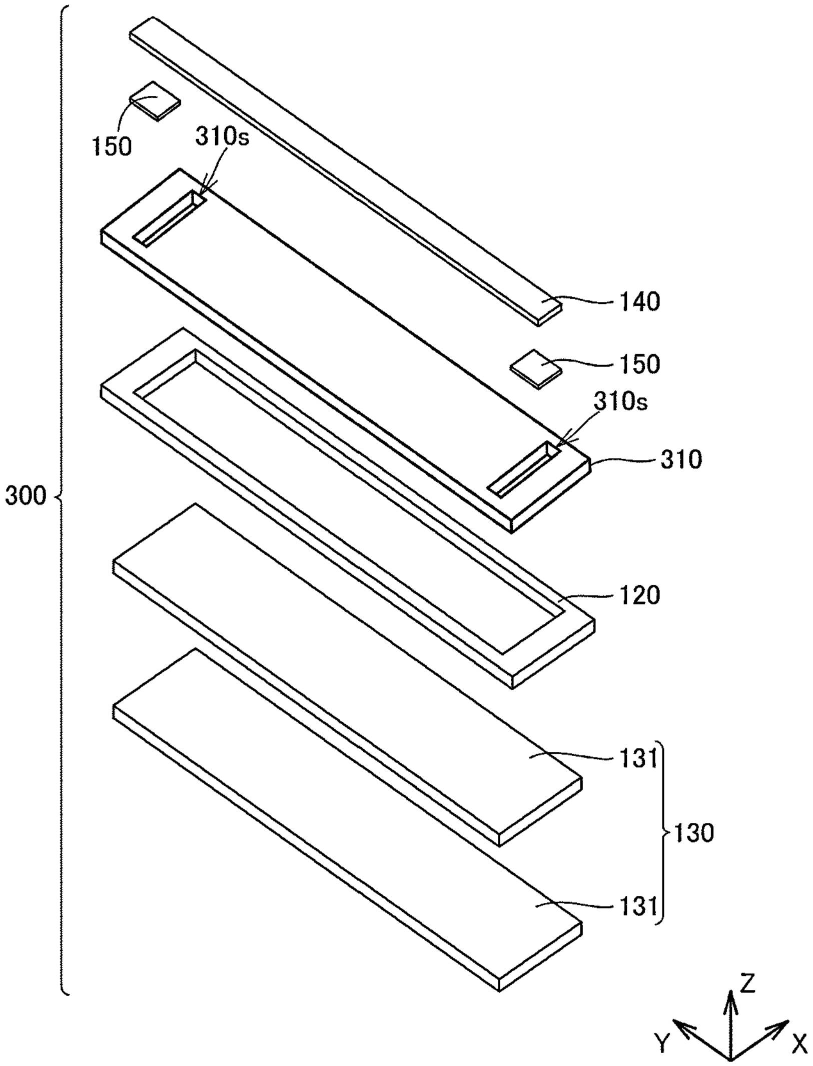
FIG. 32 is an exploded perspective view showing the configuration of an ultrasonic transducer according to Example Embodiment 3 of the present invention.

FIG. 32 is an exploded perspective view showing the configuration of the ultrasonic transducer according to Example Embodiment 3 of the present invention. As shown in FIG. 32, an ultrasonic transducer 300 according to Example Embodiment 3 of the present invention has a diaphragm 310, a frame 120, an ultrasonic vibrator 130, a resonance plate 140, and a spacer 150. At least one slit 310*s* extending in the first direction (X-axis direction) is formed in the diaphragm 310. In the present example embodiment, two slits 310*s* are formed at positions on the end edges, in the second direction (Y-axis direction), of the inner peripheral surface of the frame 120.

Each of the two slits 310*s* extends to a length dimension equal to or greater than the lateral dimension L2 of the inner side portion of the frame 120 in the first direction (X-axis direction). In the present example embodiment, the length dimension of the slit 310*s* in the first direction (X-axis direction) is equal to as the lateral dimension L2 of the inner side portion of the frame 120 in the first direction (X-axis direction). The width dimension of the slit 310*s* in the second direction (Y-axis direction) is about 0.4 mm or more and about 0.6 mm or less, for example. The slit 310*s* is formed in an area ranging from a first position on the end edges of the inner peripheral surface of the frame 120 in the second direction (Y-axis direction) to a second position obtained by moving the first position toward the inner side in the second direction (Y-axis direction) by a distance equal to the width dimension. The two slits 310*s* open to both end portions of the inner side portion of the frame 120 in the second direction (Y-axis direction), respectively.

A portion of the diaphragm 110 located between the both slits 310*s* in the second direction (Y-axis direction) while located above the inner space of the inner side portion of the frame 120 is the vibration region where the resonance vibration occurs. The longitudinal dimension of the vibration region of the diaphragm 110 is the dimension between the both slits 310*s*, and the lateral dimension of the vibration region of the diaphragm 110 is the same as the lateral dimension L2 of the inner side portion of the frame 120. In the diaphragm 110, a middle portion located in the middle of the inner side portion of the frame 120 in the longitudinal direction is greatly displaced, while the end portions located at the outer side portion of the slits 310*s* in the second direction (Y-axis direction) are hardly displaced.

In the ultrasonic transducer 300 according to Example Embodiment 3 of the present invention, since the inner space of the inner side portion of the frame 120 and the outer space of the outer side portion of the frame communicate with each other through the slits 310*s*, for example, when an adhesive for bonding the diaphragm 110 and the frame 120 is heated and solidified, the pressure change in the inner space is reduced, so that the increase in the internal stress in the ultrasonic transducer 300 can be suppressed. Further, since the locations adjacent to the slits 310*s* are free ends of the diaphragm 110, which vibrates resonantly, and are therefore easily displaced, the internal stress generated in the diaphragm 110, which vibrates resonantly, can be reduced. Therefore, in the ultrasonic transducer 300, the sound pressure level can be increased while reducing internal stress with a simple and compact configuration.

In the description of the above example embodiments, the combinable configurations may be combined with each other.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An ultrasonic transducer comprising:

a diaphragm;

at least one frame extending in a longitudinal direction and bonded to the diaphragm;

at least one ultrasonic vibrator attached to the at least one frame, respectively, and facing the diaphragm with a space therebetween; and at least one resonance plate extending along the longitudinal direction and facing the diaphragm with a gap therebetween, on a side opposite to the at least one frame with respect to the diaphragm; wherein the diaphragm is structured to vibrate resonantly in a direction perpendicular or substantially perpendicular to the diaphragm, in a phase opposite to the at least one ultrasonic vibrator;

a dimension of an inner side portion of the at least one frame in the longitudinal direction is greater than a dimension of the inner side portion of the at least one frame in a lateral direction perpendicular or substantially perpendicular to the longitudinal direction; and when a wavelength converted from a driving frequency of the at least one ultrasonic vibrator is λ, a λ/2 air resonance is capable of occurring in the gap in the lateral direction.

2. The ultrasonic transducer according to claim 1, wherein the dimension of the inner side portion of the at least one frame in the longitudinal direction is four or more times the dimension of the inner side portion of the at least one frame in the lateral direction.

3. The ultrasonic transducer according to claim 1, wherein a frequency of the air resonance is within about ±10% of a resonance frequency of the diaphragm and the at least one ultrasonic vibrator.

4. The ultrasonic transducer according to claim 1, wherein a dimension of the at least one resonance plate in the lateral direction is greater than a dimension of the gap in the direction perpendicular or substantially perpendicular to the diaphragm.

5. The ultrasonic transducer according to claim 4, wherein the dimension of the at least one resonance plate in the lateral direction is about 2.5 times or more and about 5 times or less the dimension of the gap in the direction perpendicular or substantially perpendicular to the diaphragm.

6. The ultrasonic transducer according to claim 1, wherein a thickness of the at least one resonance plate is about 0.3 mm or less.

7. The ultrasonic transducer according to claim 1, wherein the at least one frame includes a plurality of frames positioned side by side in the lateral direction and bonded to the diaphragm;

pairs of the plurality of frames adjacent to each other in the lateral direction are connected to each other at both mutual end portions in the longitudinal direction;

the at least one resonance plate includes a plurality of resonance plates positioned side by side in the lateral direction; and pairs of the plurality of resonance plates adjacent to each other in the lateral direction are connected to each other at both mutual end portions in the longitudinal direction.

8. The ultrasonic transducer according to claim 7, wherein if a dimension of the at least one resonance plate in the lateral direction is Ds, a wavelength of an ultrasonic wave in air is λa, and an arrangement pitch of the at least one ultrasonic vibrator in the lateral direction is PA, then a relationship $Ds+3\lambda a/4 \leq PA \leq Ds+5\lambda a/4$ is satisfied.

9. The ultrasonic transducer according to claim 1, wherein the at least one at least one ultrasonic vibrator is a series-type bimorph piezoelectric vibrator, a parallel-type bimorph piezoelectric vibrator, a multimorph piezoelectric vibrator, or an unimorph piezoelectric vibrator.

10. The ultrasonic transducer according to claim 1, wherein the diaphragm includes a flat plate with a plurality of slits.

11. A parametric speaker comprising:

the ultrasonic transducer according to claim 1 drivable to reproduce audible sound.

12. The parametric speaker according to claim 11, wherein the dimension of the inner side portion of the at least one frame in the longitudinal direction is four or more times the dimension of the inner side portion of the at least one frame in the lateral direction.

13. The parametric speaker according to claim 11, wherein a frequency of the air resonance is within about ±10% of a resonance frequency of the diaphragm and the at least one ultrasonic vibrator.

14. The parametric speaker according to claim 11, wherein a dimension of the at least one resonance plate in the lateral direction is greater than a dimension of the gap in the direction perpendicular or substantially perpendicular to the diaphragm.

15. The parametric speaker according to claim 14, wherein the dimension of the at least one resonance plate in the lateral direction is about 2.5 times or more and about 5 times or less the dimension of the gap in the direction perpendicular or substantially perpendicular to the diaphragm.

16. The parametric speaker according to claim 11, wherein a thickness of the at least one resonance plate is about 0.3 mm or less.

17. The parametric speaker according to claim 11, wherein the at least one frame includes a plurality of frames positioned side by side in the lateral direction and bonded to the diaphragm;

pairs of the plurality of frames adjacent to each other in the lateral direction are connected to each other at both mutual end portions in the longitudinal direction;

the at least one resonance plate includes a plurality of resonance plates positioned side by side in the lateral direction; and pairs of the plurality of resonance plates adjacent to each other in the lateral direction are connected to each other at both mutual end portions in the longitudinal direction.

18. The parametric speaker according to claim 17, wherein if a dimension of the at least one resonance plate in the lateral direction is Ds, a wavelength of an ultrasonic wave in air is λa, and an arrangement pitch of the at least one ultrasonic vibrator in the lateral direction is PA, then a relationship $Ds+3\lambda a/4 \leq PA \leq Ds+5\lambda a/4$ is satisfied.

19. The parametric speaker according to claim 11, wherein the at least one at least one ultrasonic vibrator is a series-type bimorph piezoelectric vibrator, a parallel-type bimorph piezoelectric vibrator, a multimorph piezoelectric vibrator, or an unimorph piezoelectric vibrator.

20. The parametric speaker according to claim 11, wherein the diaphragm includes a flat plate with a plurality of slits.

* * * * *